(12) United States Patent
Hodge et al.

(10) Patent No.: US 11,343,677 B2
(45) Date of Patent: May 24, 2022

(54) SECURED PAIRING OF VIDEO CAPTURE DEVICE AND MOBILE DEVICE

(71) Applicant: Xirgo Technologies, LLC, Camarillo, CA (US)

(72) Inventors: Andrew Hodge, Palo Alto, CA (US); Nathan Ackerman, Palo Alto, CA (US)

(73) Assignee: Xirgo Technologies, LLC, Camarillo, CA (US)

( * ) Notice: Subject to any disclaimer, the term of this patent is extended or adjusted under 35 U.S.C. 154(b) by 0 days.

(21) Appl. No.: 16/957,067

(22) PCT Filed: Jan. 2, 2019

(86) PCT No.: PCT/US2019/012107
§ 371 (c)(1),
(2) Date: Jun. 22, 2020

(87) PCT Pub. No.: WO2019/136106
PCT Pub. Date: Jul. 11, 2019

(65) Prior Publication Data
US 2020/0367056 A1 Nov. 19, 2020

Related U.S. Application Data

(60) Provisional application No. 62/614,163, filed on Jan. 5, 2018.

(51) Int. Cl.
*H04W 12/00* (2021.01)
*H04W 12/50* (2021.01)
*G06K 7/14* (2006.01)
*H04W 12/06* (2021.01)
(Continued)

(52) U.S. Cl.
CPC .......... *H04W 12/50* (2021.01); *G06K 7/1417* (2013.01); *H04W 12/009* (2019.01);
(Continued)

(58) Field of Classification Search
CPC ..... H04W 12/50; H04W 12/03; H04W 12/63; H04W 12/77; H04W 12/0471;
(Continued)

(56) References Cited

U.S. PATENT DOCUMENTS 9,769,368 B1    9/2017  Morford et al.
10,701,561 B1 *  6/2020  Sheffield ............. H04W 12/047
(Continued)

FOREIGN PATENT DOCUMENTS

EP        3162096 A1    5/2017

OTHER PUBLICATIONS

International Application No. PCT/US2019/012107, International Search Report and Written Opinion dated Mar. 27, 2019, 13 pages.
(Continued)

*Primary Examiner* — Mazda Sabouri
(74) *Attorney, Agent, or Firm* — Lee & Hayes, P.C.

(57) ABSTRACT

To allow secure communications between a video capturing device and mobile devices, an association process includes providing a unique pattern, such as a QR code, to the mobile device in proximity to the video capturing device. The unique pattern is used by the mobile device to request pairing with the client device, either directly or via a cloud-based system. The QR code includes an identifier or "shared secret" that allows the client device to verify the pairing request originates from the mobile device in close proximity. The association process may also involve cryptographic keys to further secure communications and may also involve a process to retrieve a mobile app without additional user intervention. Once the devices are associated, they can communicate directly using wireless communications, such as cellular or WiFi, and transfer video data and other data automatically.

17 Claims, 10 Drawing Sheets

(51) Int. Cl.
*H04W 12/03* (2021.01)
*H04W 12/63* (2021.01)
*H04W 12/77* (2021.01)
*H04W 12/0471* (2021.01)

(52) U.S. Cl.
CPC ....... *H04W 12/03* (2021.01); *H04W 12/0471* (2021.01); *H04W 12/06* (2013.01); *H04W 12/63* (2021.01); *H04W 12/77* (2021.01)

(58) Field of Classification Search
CPC ... H04W 12/009; H04W 12/06; H04W 12/65; H04W 4/40; G06K 7/1417; H04L 2463/062
See application file for complete search history.

(56) References Cited

U.S. PATENT DOCUMENTS

| | | | |
|---|---|---|---|
| 2011/0219427 A1* | 9/2011 | Hito | H04L 63/18 726/3 |
| 2012/0075465 A1 | 3/2012 | Wengrovitz et al. | |
| 2014/0006784 A1 | 1/2014 | Walker et al. | |
| 2014/0043485 A1 | 2/2014 | Bateman et al. | |
| 2014/0096215 A1* | 4/2014 | Hessler | H04W 12/06 726/7 |
| 2014/0197232 A1* | 7/2014 | Birkler | G06Q 20/3276 235/375 |
| 2014/0218544 A1 | 8/2014 | Senot et al. | |
| 2014/0273820 A1 | 9/2014 | Narayan et al. | |
| 2015/0145993 A1 | 5/2015 | Scalisi | |
| 2017/0250974 A1* | 8/2017 | Antonyraj | H04L 9/3228 |
| 2017/0278365 A1 | 9/2017 | Madar et al. | |
| 2018/0070001 A1 | 3/2018 | Nassor et al. | |
| 2018/0310033 A1 | 10/2018 | Johnson et al. | |
| 2018/0336332 A1* | 11/2018 | Singh | H04M 1/6066 |

OTHER PUBLICATIONS

European Application No. EP19735757.7, Extended European Search Report dated Jul. 16, 2020, 7 pages.

* cited by examiner

VIDEO DATA OBJECT
620

| |
|---|
| deviceId 621 |
| timestamp 622 |
| gpsTimestamp 623 |
| latitude 624 |
| longitude 625 |
| altitude 626 |
| speed 627 |
| heading 628 |
| horizontalAccuracy 629 |
| verticalAccuracy 630 |
| swVersion 631 |
| geoHash 632 |
| connectionType 633 |
| signalStrengthBarCount 634 |
| carrierName 635 |

Fig. 6b

VIDEO CLIP EVENT OBJECT
650

| |
|---|
| deviceId 651 |
| timestamp 652 |
| geoHash 653 |
| tagId 654 |
| tagType 655 |
| tagTitle 656 |
| tagLatitude 657 |
| tagLongitude 658 |
| tagAltitude 659 |
| tagSpeed 660 |
| tagHeading 661 |
| tagHorizontalAccuracy 662 |
| tagVerticalAccuracy 663 |
| tagFullVideoFileName 664 |
| TagSwVersion 665 |
| tagDeviceTypeId 666 |
| isTag (viewed 667a, shared 667b, deleted 667c, ...) |

Fig. 6c

SECURED PAIRING OF VIDEO CAPTURE DEVICE AND MOBILE DEVICE

CROSS-REFERENCE TO RELATED APPLICATIONS

The present application is a national phase entry under 35 U.S.C. § 371 of International Patent Application No. PCT/US19/12107 titled "Secured Pairing of Video Capture Device and Mobile Device," filed on Jan. 2, 2019, published in English, which claims priority to U.S. Provisional Patent Application No. 62/614,163 filed on Jan. 5, 2018, and which is a continuation-in-part of and claims priority to International Patent Application No. PCT/US17/50991, entitled "Video-Based Data Collection, Image Capture and Analysis Configuration," filed Sep. 11, 2017, which claims the benefit of U.S. Provisional Patent Application No. 62/412,764, filed Oct. 25, 2016, all of which are incorporated herein by reference in their entirety.

BACKGROUND

This disclosure generally relates to video-based data collection systems, and more specifically to securely pairing video capturing devices with mobile devices.

With the wide adoption of smartphones and our ubiquitous connectivity to the Internet and social networks, software apps and cameras have become common place in our daily lives for personal applications. We take pictures and videos with our smartphones of all sorts of events, items, and situations, and easily upload to cloud services and share them with friends, family, and other people who subscribe or follow our shared content.

Many products and services also exist in the smart home or automated home market segment. Security cameras around the home or business place are widely used that record either constantly or with event-based triggers, like motion sensors, and store the recorded video locally on video servers or upload the video to cloud services, either via wired connections through a home router or using Wi-Fi to connect to a home network. The recorded video is typically available for the user for a period of time and accessible in real time from software apps in smartphones or via websites. Multi-camera systems store video feeds from various cameras around the home and make the various feeds available to the user through a common user interface. Some services provide the ability to share these videos with other users, not only via social networks, but also based on other factors. For example, Bot Home Automation, Inc. of Santa Monica, Calif., provides camera-equipped doorbell systems called Ring. Customers get access to the video from the Ring cameras via a website, ring.com. One feature of the Ring system is called "Ring Neighborhoods" (described at https://ring.com/neighborhoods). A user can set a radius around the user's home equipped with Ring cameras and automatically get notified when other users within that radius share videos in the Ring platform. Users can share any video they find may be interesting for other users in the neighborhood. However, these systems do not provide a simple and secure approach to pair the cameras with the mobile device running an app to access the cameras' recordings.

Another area where cameras are being used is in vehicles. Safety cameras for backing up or side view cameras are becoming common-place. For commercial vehicles, like taxis or other vehicle fleets, security camera systems record video from both inside and outside the vehicle for safety and management purposes. For example, Safety Track of Belleville, Mich., provides a 2-channel dash camera system equipped with a 3G/4G cellular dongle that connects to the camera system via USB for streaming video from the vehicle in real time (described at http://www.safetytrack.net/dual-lens-in-vehicle-fleet-camera-system/). However, these in-vehicle systems are not simple to install for an average consumer and do not provide simple and efficient ways to store, retrieve, and playback the captured video wirelessly on associated mobile devices.

What is needed is a video collection and sharing platform that addresses the deficiencies of the prior art.

BRIEF SUMMARY

According to various embodiments of the present invention, a video data collection and sharing platform is provided.

In one embodiment, a method is provided for associating a video capturing device with a first mobile device by obtaining a unique pattern with a sensor in the first mobile device, sending a request based, at least in part, on the unique pattern to the video capturing device. In this embodiment, the request includes a first unique identifier for the first mobile device. The method also includes receiving a pairing notification from the video capturing device upon successful association of the video capturing device with the first mobile device.

According to another embodiment, a method is provided for associating a video capturing device with a first mobile device that includes providing a unique pattern from the video capturing device, and optionally providing it to the first mobile device. The method may also include receiving a request based in part on the unique pattern from the first mobile device and sending a pairing notification to the first mobile device upon successful association of the video capturing device with the first mobile device. The request may include a first unique identifier for the first mobile device.

According to yet another embodiment, a method is provided for associating a video capturing device with a first mobile device that includes receiving from the first mobile device a request based, at least in part, on a unique pattern, sending the request to the video capturing device, and sending a pairing notification to the first mobile device upon successful association of the video capturing device with the first mobile device. In this embodiment, the request may also include a first unique identifier for the first mobile device;

According to these various embodiments, the unique patterns may include a QR code, a random code, a set of successive black and white screens in a random order, a bar code, a sound, a set of instructions to cause a motion-based pattern of the first mobile device, a face recognition signal, a fingerprint signal, or a voice recognition signal. The unique pattern can be obtained from the video capturing device and may also be provided to the first mobile device. For example, in one embodiment, the unique pattern is a QR code displayed on a display of the video capturing device.

According to one embodiment, if the unique pattern is a face recognition signal, a fingerprint signal, or a voice recognition signal, a method can also include receiving from the video capturing device a message based, at least in part, on a second unique pattern, comparing the message with the request to determine if the unique pattern and the second unique pattern correspond to a same user, and the successful association can then be based, at least in part, on the unique pattern and the second unique pattern corresponding to the same user.

According to embodiments in which the unique pattern is a QR code, the QR code may encode a second unique identifier and the method then includes decoding the unique pattern to determine the second unique identifier. The second unique identifier may, for example, be the same as the first unique identifier for the first mobile device. Alternatively, the second unique identifier may be a phone number or an email address associated with the video capturing device. As another option, the QR code can also encode encryption key data and the method would also include decoding the unique pattern to determine the encryption key. In such embodiments, the method could also include encrypting the request before sending it using the encryption key, where the sending could be done via a text message to a phone number encoded in the QR code.

According to other embodiments, the sending can also include sending the request to a cloud system associated with the video capturing device. In such embodiments, the cloud system may be configured to transfer the request to the video capturing device via wireless communications. According to another aspect in these embodiments, the unique pattern may encode a topic associated with the video capturing device and the request can be addressed to the topic. In addition, the unique pattern may also encode a second unique identifier that is associated with a proximity signal corresponding to the first mobile device detected by the video capturing device. According to other embodiments, the method can include detecting the first mobile device in proximity to the video capturing device, for example, by scanning wireless signals for Bluetooth identifiers. Optionally, the method can also include assigning a second unique identifier to the first mobile device detected in proximity to the video capturing device, then the unique pattern can also encode the second unique identifier. In such embodiments, the method can also include comparing the first unique identifier in the request with the second unique identifier associated to the proximity signal of the first mobile device and successfully associating the video capturing device with the first mobile device if the comparison results in a match. In such embodiments, the successful association can be based, at least in part, on a match between the first unique identifier in the request and the second unique identifier associated to the proximity signal of the first mobile device.

According to another aspect in the aforementioned embodiments, the cloud system may be configured to transfer the request to the video capturing device upon determining that the association with the first mobile device is appropriate. For example, this determining may include determining if a second mobile device was previously associated with the video capturing device. If so, in one embodiment, the determining includes receiving authorization from the second mobile device for the association with the first mobile device.

According to other embodiments, the unique pattern may encode a URL for a server in a cloud system associated with the video capturing device and a random number. In such embodiments, the method also includes decoding the unique pattern to determine the URL and the random number, transmitting an HTML request to the determined URL including the random number as a parameter, the HTML request transmission including network parameters associated with the first mobile device, and receiving a redirection instruction from the cloud system to a network source for a mobile device app associated with the video capturing device. Once obtained, the mobile device app is executed in the first mobile device, the executing may include obtaining the random number from the cloud system using the network parameters associated with the first mobile device. In such embodiments, the executing ma also include the sending of the request and the request can include at least a portion of the random number encoded in the unique pattern and obtained from the cloud system.

In an alternative embodiment, the method may include receiving an HTML request addressed to the URL and including the random number as a parameter, the HTML request including network parameters associated with the first mobile device, providing a redirection instruction to the first mobile device, the redirection instruction providing an address to a network source for a mobile device app associated with the video capturing device, and receiving a request from the mobile device app executing on the first mobile device to obtain the random number based on the network parameters associated with the first mobile device. In such embodiment, the request may include the first unique identifier for the first mobile device and at least a portion of the random number encoded in the unique pattern and obtained from the cloud system.

In such embodiments, the successful association may be based, at least in part, on a match between the at least a portion of the random number in the request and a random number stored in the video capturing device. According to another aspect of these embodiments, the executing of the mobile app can also include obtaining additional parameters for associating the video capturing device with the first mobile device. For example, the additional parameters may include a phone number for the video capturing device. If that is the case, the sending the request can include sending a text message addressed to the phone number. In addition, the first unique identifier may be a phone number for the first mobile device.

According to another aspect of some embodiments, the pairing notification may include network connection parameters for establishing a WiFi connection with the video capturing device. In such embodiments, the method can also include establishing a WiFi connection with the video capturing device. Then, the method can also include, for example, automatically receiving video data from the video capturing device upon establishing the WiFi connection.

According to another aspect of one embodiment, the method also includes receiving video data from the video capturing device after receiving the pairing notification. The video data may be for example sent and received via a cellular connection or a WiFi connection. The video data may include a video clip, buffered video data, or streaming live video data from the video capturing device.

According to yet another embodiment, a method is provided for associating a video capturing device with a mobile device that includes activating the video capturing device by establishing a wireless connection with a cloud-based system, detecting a mobile device in physical proximity to the video capturing device, generating a globally unique identifier for the mobile device, and posting a pairing message in a messaging interface of the cloud-based system. In this embodiment, the pairing message may be directed to the mobile device based on the globally unique identifier. The method further includes providing from the video capturing device a code capable of being obtained by the mobile device while in physical proximity to the video capturing device. In this embodiment, the code may include information representative of the globally unique identifier generated for the mobile device. The method may also include receiving a pairing request message from the mobile device through the messaging interface of the cloud-based system. The pairing request message may include information indicating that the message was sent by the mobile device detected to be in physical proximity. The method further includes notifying the mobile device upon successful association with the video capturing device.

According to this embodiment, detecting a mobile device in physical proximity may include scanning wireless signals for Bluetooth identifiers. In this embodiment, the messaging interface may operate according to a Message Queuing Telemetry Transport ("MQTT") protocol, an Advanced Message Queuing Protocol ("AMQP"), a Streaming Text Oriented Messaging Protocol ("STOMP"), an IETF Constrained Application Protocol ("CoAP"), an Extensible Messaging and Presence Protocol ("XMPP"), an OPC-UA protocol, or a Web Application Messaging Protocol ("WAMP").

BRIEF DESCRIPTION OF THE SEVERAL VIEWS OF THE DRAWINGS

FIG. 6b illustrates a data model for capturing metadata associated with a given video data object or file according to one embodiment.

FIG. 6c illustrates a data model for capturing metadata associated with a given event-based video clip according to one embodiment.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures. The above and other needs are met by the disclosed methods, a non-transitory computer-readable storage medium storing executable code, and systems for streaming and playing back immersive video content.

Figure 1:
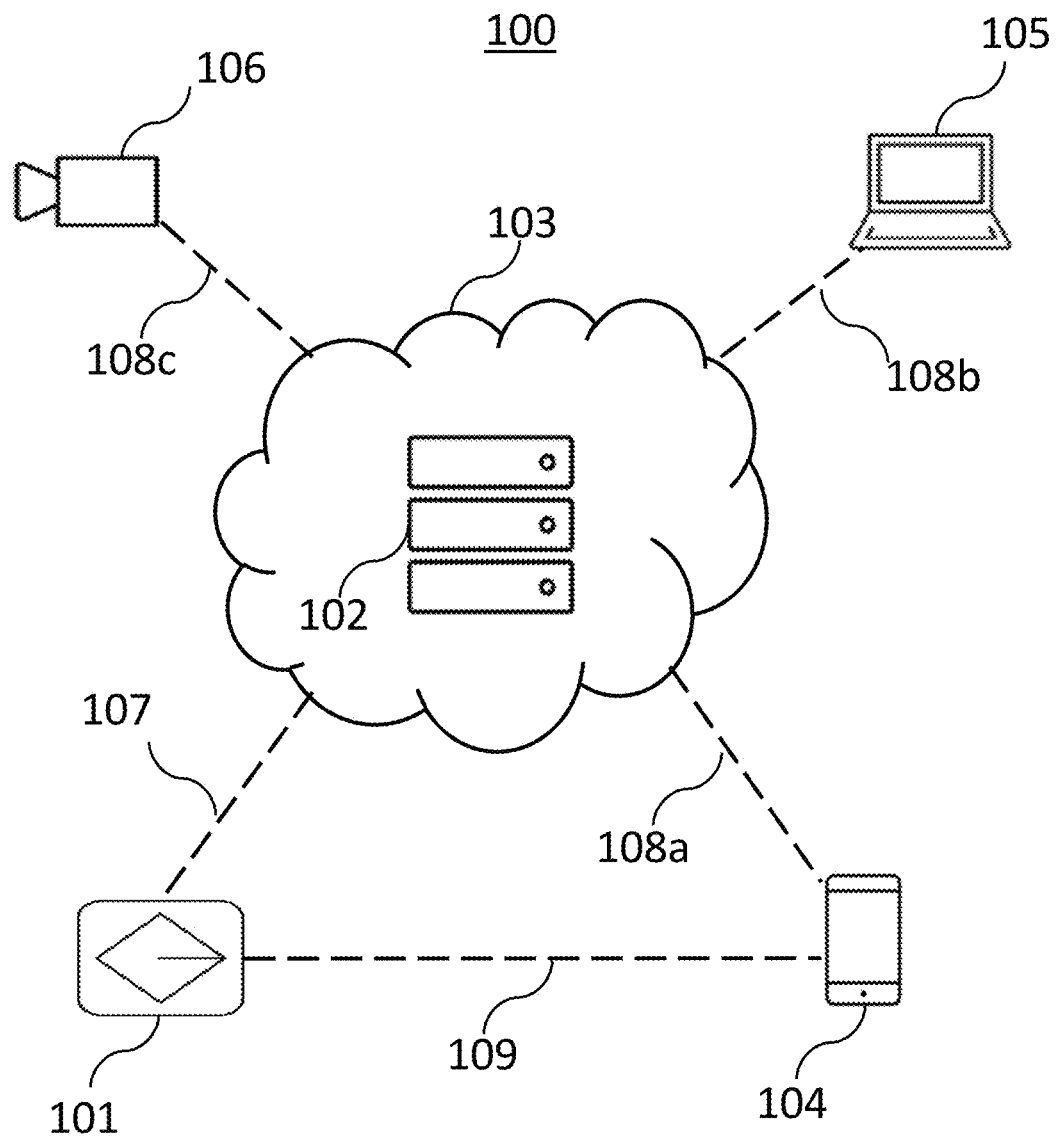
FIG. 1 illustrates an exemplary video-based data capture and analysis system according to one embodiment of the disclosure.

Referring now to FIG. 1, an exemplary vehicular video-based data capture and analysis system 100 according to one embodiment of the disclosure is provided. Client device 101 is a dedicated data capture and recording system suitable for installation in a vehicle. In one embodiment, client device 101 is a video-based dash camera system designed for installation on the dashboard or windshield of a car. Client device 101 is connected to cloud-based system 103. In one embodiment, cloud-based system 103 includes a server system 102 and network connections, such as for example, to Internet connections. In one embodiment, cloud-based system 103 is a set of software services and programs operating in a public data center, such as an Amazon Web Services (AWS) data center, a Google Cloud Platform data center, or the like. Cloud-based system 103 is accessible via mobile device 104 and web-based system 105. In one embodiment, mobile device 104 includes a mobile device, such as an Apple iOS based device, including iPhones, iPads, or iPods, or an Android based device, like a Samsung Galaxy smartphone, a tablet, or the like. Any such mobile device includes an application program or app running on a processor. Web-based system 105 can be any computing device capable of running a Web browser, such as for example, a Windows™ PC or tablet, Mac Computer, or the like. Web-based system 105 may provide access to information or marketing materials of a system operations for new or potential users. In addition, Web-based system 105 may also optionally provide access to users via a software program or application similar to the mobile app further described below. In one embodiment, system 100 may also include one or more auxiliary camera modules 106. For example, one or more camera modules on a user's home, vacation home, or place of business. Auxiliary camera module 106 may be implemented as a client device 101 and operate the same way. In one embodiment, auxiliary camera module 106 is a version of client device 101 with a subset of components and functionality. For example, in one embodiment, auxiliary camera module 106 is a single camera client device 101.

Client device 101 is connected to cloud-based system 103 via connection 107. In one embodiment, connection 107 is a cellular-based wireless packet data connection, such as a 3G, 4G, LTE, 5G, or similar connection. Connections 108a-108c between other system components and cloud-based system 103 are Internet-based connections, either wired or wireless. For example, in one embodiment, mobile device 104 may at different times connect to cloud-based system 103 via Wi-Fi (i.e., any IEEE 802.11-based connection or similar technology) and cellular data (e.g., using 4G, LTE, or the like). In one embodiment, Web-based system 105 is connected to cloud-based system 103 over the World Wide Web using a wired Internet connection, such as DSL, cable modem, or the like. Similarly, in one embodiment, auxiliary camera module 106 is connected to cloud-based system 103 via a Wi-Fi connection to a home router connected to the Internet via cable modem, DSL, or the like. Any combination of available connections can be used to connect any of the system components to cloud-based system 103 via the Internet or similar networks.

Figure 2:
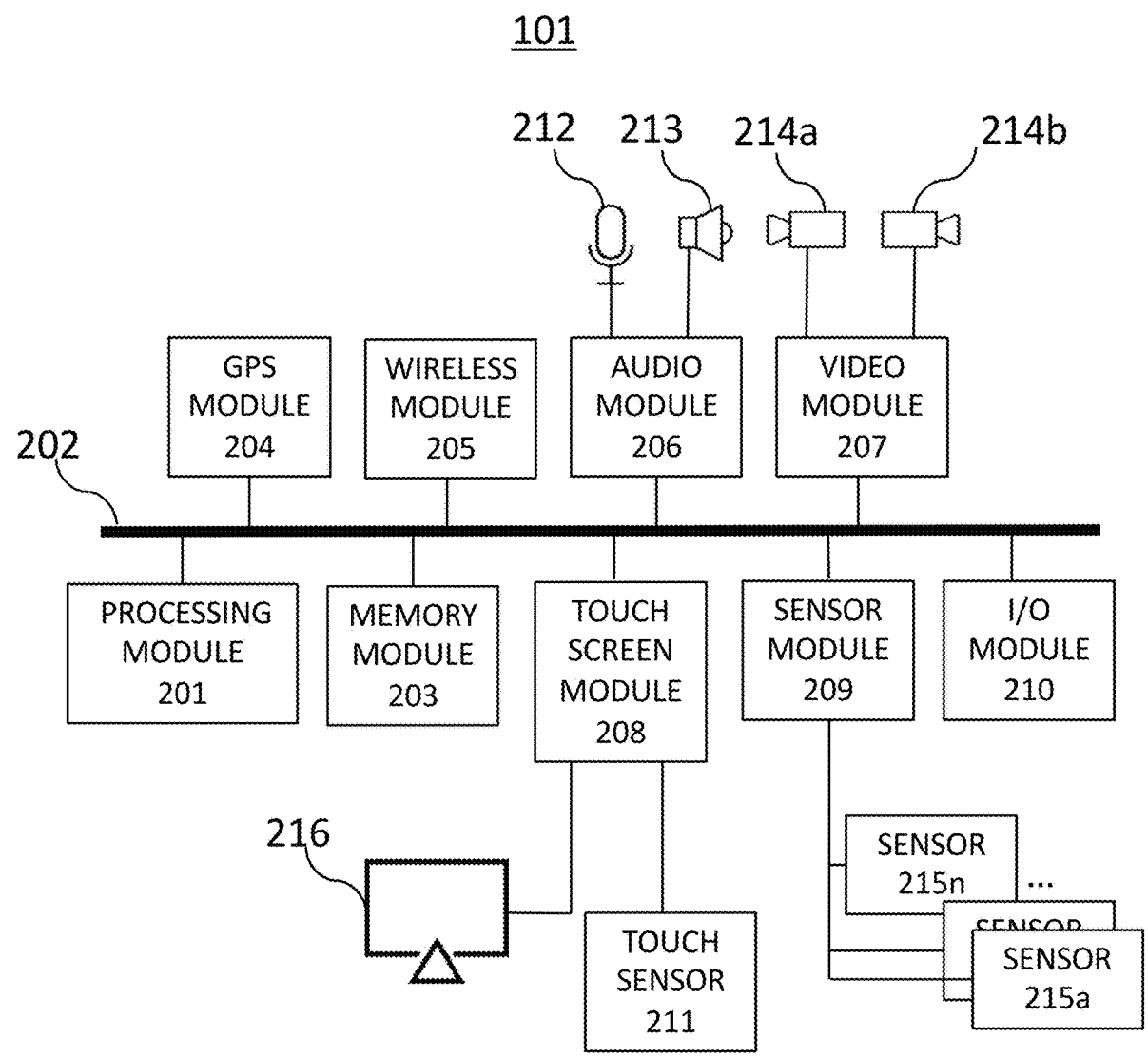
FIG. 2 is a functional block diagram of a client device according to one embodiment of the disclosure.

Referring now to FIG. 2, a functional system diagram for a client device 101 according to one embodiment is shown. Different embodiments may include a subset of the components shown in FIG. 2 and/or other components not shown. In alternative embodiments, the components shown in FIG. 2 (as well as additional components not shown, such as for example, HDMI modules, battery charger and/or power supply modules, and the like) may be part of a System-on-Chip (SoC) device, multiple chips on a board, ASICs, or the like. The physical implementation of the components, either in silicon-based integrated circuits or software are left as a design choice of the person of ordinary skill in the art without departing from the invention. The client device 101 includes a microprocessor 201 connected to a data bus 202 and to a memory device 203 and additional functional modules. In one embodiment, microprocessor 201 is a Qualcomm Snapdragon MSM8953 but other microprocessors may be used to implement the invention, such as for example, other Qualcomm's Snapdragon processors, ARM Cortex A8/9 processors, Nvidia's Tegra processors, Texas Instruments OMAP processors, or the like. The microprocessor 201 executes operating system software, such as Linux, Android, iOS, or the like, firmware, drivers, and application software.

The client device 101 in this exemplary embodiment includes a location module 204, a wireless transceiver module 205, an audio I/O module 206, a video module 207, a touchscreen module 208, a sensor module 209, and an I/O module 216. In this embodiment, the different modules are implemented in hardware and software modules. In alternative embodiments, these modules can be hardware, software, or a combination of both. For example, alternative embodiments may be provided with one or more central processor ("CPU") cores on an SoC also including a wireless modem, multimedia processor, security and optionally other signal co-processors, such as for example, one or more graphics processor unit ("GPU") cores, one or more holographic processing unit ("HPU") cores, and/or one or more vision processing units ("VPU"). In one embodiment, one or more SoC processors used to embody the invention may encompass CPUs, GPUs, VPUs, HPUs, and other co-processors, motherboard buses, memory controllers, screen controllers, sound chipsets, camera modules, on-board memory, and several peripheral devices, including for example cellular, Wi-Fi, and Bluetooth transceivers, as further described below. Alternative embodiments include modules as discrete components on a circuit board interconnected by bus 202 or a combination of discrete components and one or more SoC modules with at least some of the functional modules built-in.

In one embodiment, location module 204 may include one or more satellite receivers to receive and decode signals from location satellite systems, such as Global Positioning System ("GPS"), Global Navigation Satellite System ("GLONASS"), and/or BeiDou satellite systems. In one embodiment, location module 204 is a Qualcomm QTR2965 or Qualcomm QGR7640 receiver that connects to a GPS antenna for receiving GPS satellite signals and providing geographical coordinates (latitude and longitude) of the location of the client device 101. The wireless transceiver module 205 includes a cellular modem, e.g., compliant with 3G/UMTS, 4G/LTE, 5G or similar wireless cellular standards, a Wi-Fi transceiver, e.g., compliant with IEEE 802.11 standards or similar wireless local area networking standards, and a Bluetooth transceiver, e.g., compliant with the IEEE 802.15 standards or similar short-range wireless communication standards. In one embodiment, the wireless transceiver module 205 is a Sierra Wireless HL-7588.

The audio I/O module 206 includes an audio codec chipset with one or more analog and/or digital audio input and output ports and one or more digital-to-analog converters and analog-to-digital converters and may include one or more filters, sample rate converters, mixers, multiplexers, and the like. For example, in one embodiment, a Qualcomm WCD9326 chipset is used, but alternative audio codecs may be used. In one embodiment, video module 207 includes a DSP core for video image processing with video accelerator hardware for processing various video compression formats and standards, including for example, MPEG-2, MPEG-4, H.264, H.265, and the like. In one embodiment, video module 207 is integrated into an SoC "multimedia processor" along with processor 201. For example, in one embodiment, client device 101 includes an integrated GPU inside the Qualcomm MSM8953 but alternative embodiments may include different implementations of video module 207.

In one embodiment, the touchscreen module 208, is a low-power touchscreen sensor integrated circuit with a capacitive touchscreen controller as is known in the art. Other embodiments may implement touchscreen module 208 with different components, such single touch sensors, multi-touch sensors, capacitive sensors, resistive sensors, and the like. In one embodiment, the touchscreen module 208 includes an LCD controller for controlling video output to the client device's LCD screen. For example, in one embodiment, touchscreen module 208 includes a device used for LCD control. LCD controller may be integrated into a touchscreen module 208 or, in alternative embodiments, be provided as part of video module 207, as a separate module on its own, or distributed among various other modules.

In one embodiment, sensor module 209 includes controllers for multiple hardware and/or software-based sensors, including, accelerometers, gyroscopes, magnetometers, light sensors, gravity sensors, geomagnetic field sensors, linear acceleration sensors, rotation vector sensors, significant motion sensors, step counter sensors, step detector sensors, and the like. For example, in one embodiment, sensor module 209 is and Invensense ICM-20608. Alternative implementations of sensor module 209 may be provided in different embodiments. For example, in one embodiment, sensor module 209 is an integrated motion sensor MEMS device that includes one or more multi-axis accelerometers and one or more multi-axis gyroscopes. Client device 101 may also include one or more I/O modules 210. In one embodiment, I/O module 210 includes a Universal Serial Bus (USB) controller, a Controller Area Network (CAN bus) and/or a LIN (Local Interconnect Network) controller.

In one embodiment, client device 101 also includes a touchscreen 211. In alternative embodiments, other user input devices (not shown) may be used, such as a keyboard, mouse, stylus, or the like. Touchscreen 211 may be a capacitive touch array controlled by touchscreen module 208 to receive touch input from a user. Other touchscreen technology may be used in alternative embodiments of touchscreen 211, such as for example, force sensing touch screens, resistive touchscreens, electric-field tomography touch sensors, radio-frequency (RF) touch sensors, or the like. In addition, user input may be received through one or more microphones 212. In one embodiment, microphone 212 is a digital microphone connected to audio module 206 to receive user spoken input, such as user instructions or commands. Microphone 212 may also be used for other functions, such as user communications, audio component of video recordings, or the like. Client device may also include one or more audio output devices 213, such as speakers or speaker arrays. In alternative embodiments, audio output devices 213 may include other components, such as an automotive speaker system, headphones, stand-alone "smart" speakers, or the like.

Client device 101 can also include one or more cameras 214, one or more sensors 215, and a screen 216. In one embodiment, client device 101 includes two cameras 214a and 214b. Each camera 214 is a high definition CMOS-based imaging sensor camera capable of recording video one or more video modes, including for example high-definition formats, such as 1440p, 1080p, 720p, and/or ultra-high-definition formats, such as 2K (e.g., 2048×1080 or similar), 4K or 2160p, 2540p, 4000p, 8K or 4320p, or similar video modes. Cameras 214 record video using variable frame rates, such for example, frame rates between 1 and 300 frames per second. For example, in one embodiment cameras 214a and 214b are Omnivision OV-4688 cameras.

Alternative cameras 214 may be provided in different embodiments capable of recording video in any combinations of these and other video modes. For example, other CMOS sensors or CCD image sensors may be used. Cameras 214 are controlled by video module 207 to record video input as further described below. A single client device 101 may include multiple cameras to cover different views and angles. For example, in a vehicle-based system, client device 101 may include a front camera, side cameras, back cameras, inside cameras, etc.

Figure 3:
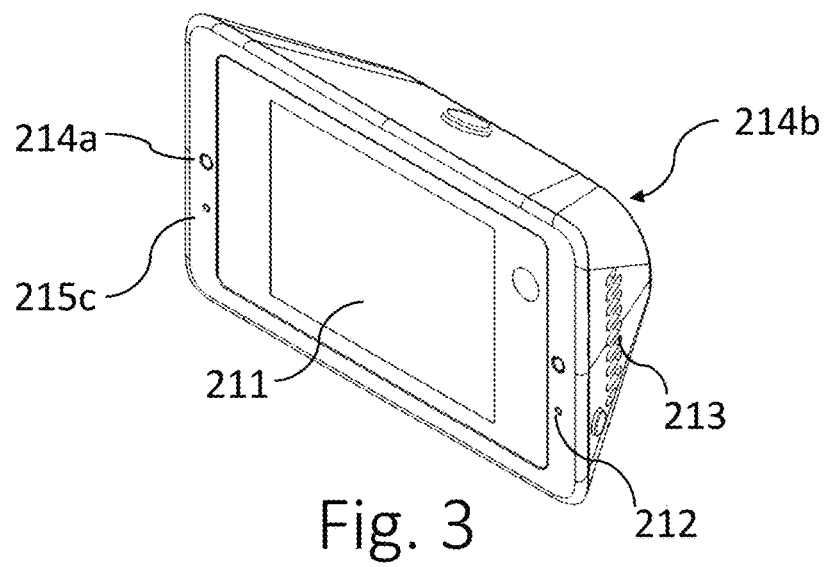
FIG. 3 is a block diagram of a dash camera client device according to one embodiment.

Client device 101 can include one or more sensors 215. For example, sensors 215 may include one or more hardware and/or software-based sensors, including, accelerometers, gyroscopes, magnetometers, light sensors, gravity sensors, geomagnetic field sensors, linear acceleration sensors, rotation vector sensors, significant motion sensors, step counter sensors, step detector sensors, and the like. In one embodiment, client device 101 includes an accelerometer 215a, gyroscope 215b, and light sensor 215c. FIG. 3, provides an illustrative embodiment of a client device implemented as a dash camera system according to the invention.

Referring back to FIG. 1, another component of system 100 is a mobile device 104. Mobile device 104 may be an Apple iOS based device, such as an iPhone, iPad, or iPod, or an Android based device, such as for example, a Samsung Galaxy smartphone, a tablet, a PDA, or the like. In one embodiment, mobile device 104 is a smartphone with one or more cameras, microphone, speakers, wireless communication capabilities, and sensors. For example, mobile device 104 may be an Apple iPhone 5, 6, 7, 8 or X. The wireless communication capabilities of mobile device 104 preferably include wireless local area networking communications, such as 802.11 compatible communications or Wi-Fi, short-range low-power wireless communications, such as 802.15 compatible communications or Bluetooth, and cellular communications (e.g., 4G/LTE, 5G, or the like). In addition, mobile device 104 preferably includes an application program or app running on a processor. One of ordinary skill in the art is familiar with mobile operating systems and mobile apps. Mobile apps are typically made available and distributed through electronic means, such as for example, via electronic "stores" such as the Apple App Store or the Google Play Store, or directly from apps providers via their own websites. It should be noted that mobile device app is not required for operation of the system, for example, camera device 101/106 may include a voice-enabled interface, a chat-bot interface, or the like. However, several embodiments include the use of a mobile app.

A mobile app on mobile device 101 provides a user interface to a user account on cloud system 103 and to client device 101. In one embodiment, mobile app includes functionality similar to auxiliary camera 106. For example, mobile app uses one or more cameras on mobile device 104 to record video events in accordance to one embodiment of the disclosure. The video recording, buffer management, and other methods and techniques described herein may be also incorporated into mobile app in one or more embodiments of the invention.

Figures 4A, 4B, 4C:
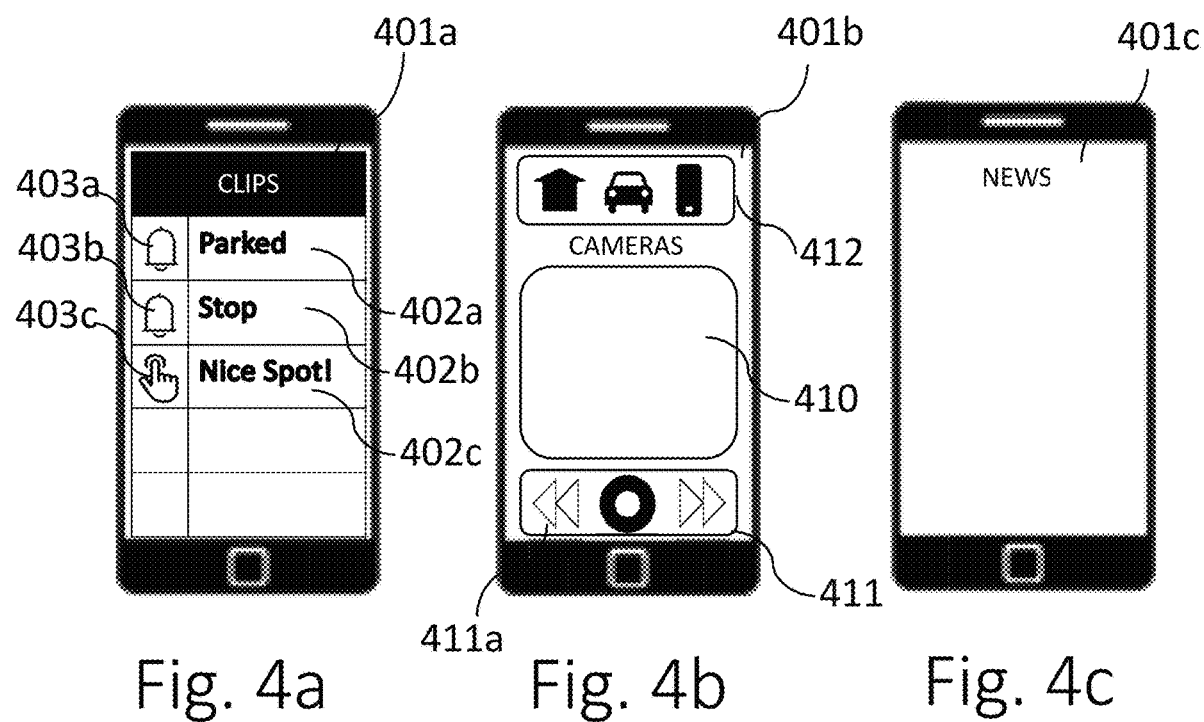
FIG. 4a shows a graphical user interface (GUI) for a "clips pane" in a mobile app in mobile device according to one embodiment.
FIG. 4b shows a graphical user interface (GUI) for a "camera pane" in a mobile app in mobile device according to one embodiment.
FIG. 4c shows a graphical user interface (GUI) for a "news pane" in a mobile app in mobile device according to one embodiment.

Now referring to FIG. 4a-4e, a user interface for an app in mobile device 104 according to one embodiment is described. In one embodiment, the mobile app includes one or more panes 401. For example, FIG. 4a shows a graphical user interface (GUI) for a clips pane 401a in a mobile app in mobile device 104 according to one embodiment. The mobile app can receive video clips from multiple sources and store them locally. For example, video clips can be received from cloud system 103. Client devices 101, auxiliary cameras 106, and mobile devices 104 of the user and other users can upload video clips to cloud system 103. Video clips can also be directly sent to mobile device 104, for example from a client device 101 or an auxiliary camera 106. Video clips can also be locally generated on mobile device 104. In an alternative embodiment, only metadata for a clip is provided to the mobile app while the video data for the clip is stored remotely. For example, video data objects (such as for example files, data records, data objects, or the like) may be stored on cloud servers 102 or in local memory of client devices 101, auxiliary cameras 106, or other mobile devices 104 and remotely accessible over the Internet. According to one embodiment, one or more types video clips from one or more of these sources can be made available through the clips pane 401a of mobile app as illustrated in FIG. 4a. Clips pane 401a includes a listing of video clips that can be accessed by the user via mobile device 104. In one embodiment, clips are added to the clips pane 401a along with an alert to the user on the mobile device 104. For example, every time a clip is generated by a client device 101, client device causes a clip alert to be displayed to the user's mobile device 104 and the generated clip is listed on clips pane 401a available for access by the user. For each available video clip, a descriptor 402a-n and a clip type icon 403a-n are provided. In one embodiment, clip type icon 402 provides a visual indicator of the source of the video clip. For example, clip type icons 402a-b indicate that those clips were automatically generated via the auto-tagging method (as further described below) and clip type 402c indicates that that clip was user-generated. In additional embodiments, these and other clip types may be used. For example, in one embodiment, a multi-clip type icon may be used to indicate availability of multiple clips related to the same event, such as for example, multiple clips generated from different camera devices providing different viewpoints of the same event as further described below. Descriptors 402 provided text associated with the video clip, such as, for example, a user-generated description or an auto-tag descriptor as further described below. As one of ordinary skill in the art would understand, other icons 403 for different clip types and descriptors 402 may be used in a clips pane 401a in accordance with this disclosure. A user of the mobile app can cause mobile device to playback a video clip listed in the clips pane 401a by clicking on or touching the video clip listing on the clips pane 401a. The mobile app causes a media player, either built-in or provided through the operating system of the mobile device 104, to play the selected video clip. According to one embodiment, live camera feeds from multiple sources can be displayed on the mobile device 104 through the camera pane 401b of mobile app as illustrated in FIG. 4b. In one embodiment, the camera pane 401b includes a camera feed window 410, a camera control interface 411 and a camera selection interface 412. Alternative embodiments may include a subset or additional elements in camera pane 401b. F or example, camera selection interface 412 may be not included in a single-camera embodiment. Additional embodiments are described below with references to FIG. 4D and FIG. 4E. Camera feed window 410 displays the video feed from the currently selected camera. In one embodiment, the camera feed window 410 is enlarged to take the entire screen upon user selection, becoming for example the window of an associated media player app. For example, once the appropriate video playback is selected, the screen may be automatically enlarged or upon tilting of the mobile device 104 to a side, the camera feed window 410 (in "landscape" orientation) takes up the full mobile device display. Cameras may be selected using the camera selection interface 412. For example, camera selection interface 412 may display a selection option 412a-n for each of 1-n available cameras. In one embodiment, icons are used to depict each of the available cameras, such as a home camera (e.g., an auxiliary camera 105), a vehicle camera (e.g., from a client device 101), and a phone camera (e.g., the camera on the mobile device 106). Any number of additional cameras may be made available and the selection interface 412 modified to allow selection, such as via a drop-down menu, a pop-up "edit" menu, a picker menu, a rolling menu, or the like. In one embodiment, real time camera feeds are provided to the mobile app with the same approach used for providing video clips based on a playlist file or manifest file as further described below. For real-time feeds, the playlist files are dynamically updated to include each newly generated video data object or file captured by the relevant camera. For each new video file, the file location is provided in the updated playlist and the playlist file is updated via the cloud system 103 or directly from the source of the video feed. For example, in one embodiment, playlist files for streaming video are dynamically updated as described in the HTTP Live Streaming specification (as for example described in Internet Draft draft-pantos-http-live-streaming-23 submitted by Apple, Inc. to IETF on May 22, 2017) incorporated herein by reference in its entirety. Alternative streaming techniques may be used in other embodiments, including, for example, MPEG-DASH (ISO/IEC 23009-1), Adobe's HTTP Dynamic Streaming, Microsoft's Smooth Streaming, or the like.

In one embodiment, camera pane 401b includes camera control elements 411. For example, a recording or manual tagging control element 411a is provided for the user to instruct the currently selected camera to generate a clip for the currently displayed video (as further described below). For example, if a user is involved in a video-clip-generating event, e.g., car accident, police stop, break-in, or the like, in addition to the any video clips generated through client device 101, either manually or automatically, mobile device 104 can also be used to generate additional video clips for the given event from a different angle or perspective. Further, in one embodiment, any time the mobile app is running on the mobile device 104, one or more cameras on the mobile device 104 are recording video data and manual tagging control element 411a is used to generate a manually-tagged video clip as further described below. Thus, mobile device 104 can be used as client device 101 or auxiliary camera device 106 according to this embodiment.

Figure 11:
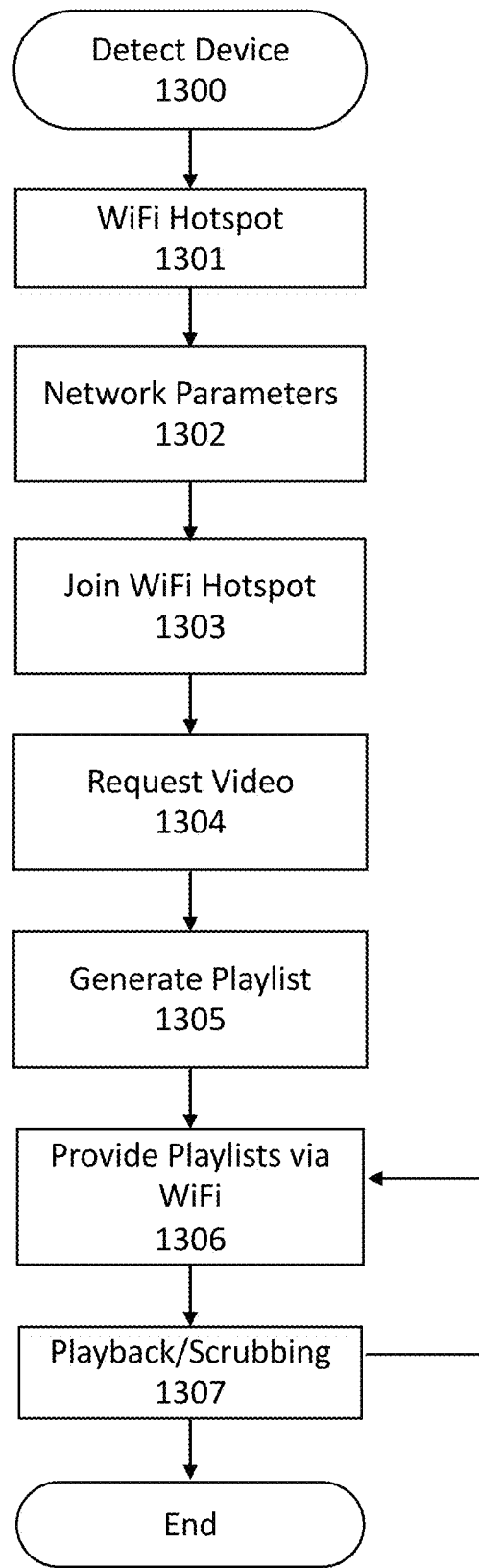
FIG. 11 is a flow chart illustrating a method for scrubbing or playing back high-quality video data stored in a buffer over wireless communication according to one embodiment.

In one embodiment, camera pane 401b may also include additional control elements 411, such as, buttons, icons, or other selection elements or menus, to access non-live video stored in the buffer of the currently selected camera. For example, a user may remotely access an entire set of video data objects or files stored in the buffer of the user's client device 101 (e.g., video files for the preceding 24 hours) through user control elements 411. In one embodiment, based on the user input selecting a point in time from which to begin streaming buffered video, the source camera device (e.g., client 101, auxiliary camera 106, or other camera device) generates a dynamic playlist or manifest file including the video files for the next preset time period, for example, one minute, and it is progressively and dynamically updated in increments of same amount of time (e.g., every minute) with the next set of video files. FIG. 11, further described below, provides an illustrative method according to one embodiment for accessing the entire set of video data object or files stored in a client device buffer using this playlist approach. The playlist or manifest files are generated as further described below with reference to video clip generation methods.

Figure 4D:
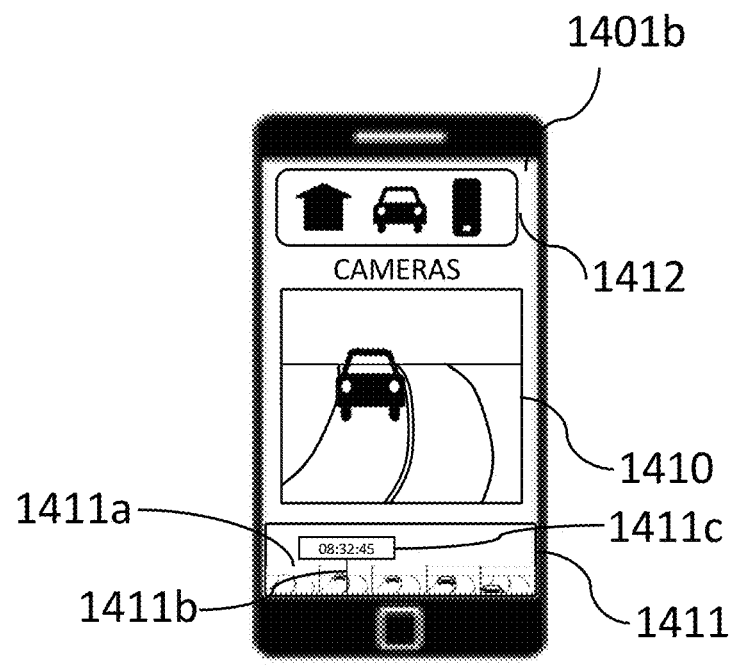
FIG. 4d shows a graphical user interface (GUI) for a "camera pane" in a mobile app in mobile device according to another embodiment.

Now referring to FIG. 4D, a graphical user interface (GUI) for an alternative "camera pane" 1401b in a mobile app in mobile device 104 according to another embodiment is provided. In this embodiment, the camera selection interface 1412 allows the user to select source device, such as a camera in a client device 101/106, and the video for the selected camera stored in the buffer of the selected device is displayed in the camera feed window 1410. However, the camera control interface 1411 includes a time slider interface 1411b. The control interface 1411 displays an indicator of the available buffered video 1411a, such as for example a color bar, a video timeline bar with snapshots of the video at periodic intervals, or the like. The time slider interface 1411b includes a time stamp 1411c representative of the time metadata in the buffered video. A user may move the slider along the video indicator bar 1411a to select the appropriate starting point for playback of the video. In one embodiment, the video indicator bar 1411a represents the entirety of the available buffered video for the selected camera device. In one embodiment, playback of the selected video takes place using manifest files as further described with reference to FIG. 11.

Figure 4E:
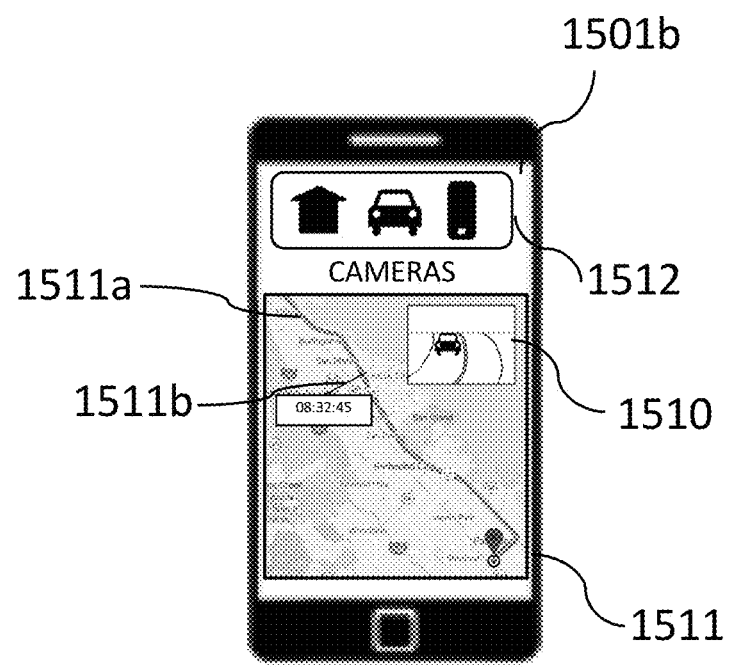
FIG. 4e shows a graphical user interface (GUI) for a "camera pane" in a mobile app in mobile device according to another embodiment.

Now referring to FIG. 4e, another graphical user interface (GUI) for an alternative "camera pane" 1501b in a mobile app in mobile device 104 according to yet another embodiment is provided. In this embodiment, the camera selection interface 1512 also allows the user to select source device, such as a camera in a client device 101/106, and the video for the selected camera stored in the buffer of the selected device is displayed in the camera feed window 1510. In this embodiment, the camera feed window 1510 shows a thumbnail, lower resolution, version of the video corresponding to the video stored in the buffer at the selected location or time. In this embodiment, instead of a time slider, a location slider 1511b is provided. The camera control interface 1511 provides a map representative of the area where the video stored in the buffer was captured. For example, the metadata captured along with the video data is used to define the geo-coordinates for the stored video data and a path of travel 1511a is plotted on a map to indicate the locations represented in the stored video. The location slider 1511b can be moved by the user along the path of travel 1511a to select the video from the buffer that was captured at the selected location.

In addition, in one embodiment, the location slider 1511b also provides a time stamp corresponding to the time when the selected video was captured. This allows the user to uniquely select the appropriate video when the buffer stores more than one video data object for a given location. In one embodiment, once the playback start point in the buffer is selected by the user through the camera control interface 1511, the video is played in a larger camera feed window (not shown) such as those illustrated in FIG. 4b and FIG. 4d. For example, in one embodiment, the camera control interface 1511 map and the camera feed window 1510 are swapped upon the video playback start point selection. The video thumbnail is replaced with the full resolution video in the larger size window while the map is reduced in size and the location slider 1511b is replace with a location indicator that is updated with the location metadata 624/625 (as for example described with reference to FIG. 6b) to indicate the location of the camera device when the displayed video was captured. As those of ordinary skill will appreciate, the relative size and position of the camera feed window 1510 and synchronized map 1511 may be changed in different embodiments without departing from the teachings of the invention. Further, in alternative embodiments, other synchronized displays of video and corresponding metadata are provided, such as time stamp 622, speed 627, heading 628, altitude 626, or the like. The metadata may be displayed in a separate window or overlaid on the video and the items of metadata displayed may be based on user selection or automatically determined, based for example on availability, screen size, intended application, or the like.

Now referring to FIG. 4c, in one embodiment, a mobile app on mobile device 104 may also include a news pane 401c. News pane 401c provides information from a cloud service provider to users. In one embodiment, news pane 401c may provide the user with links to video clips on cloud service 103 that are related to video clips generated by the user's device or devices. For example, links to videos from nearby camera devices generated around the same time as an event video clip of the user (e.g., a car crash, break-in, or the like) and available from other users may be provided to the user on the news pane 401c.

As noted above, the features described above with respect to the mobile app may also be provided via Web-based system 105 using conventional website programming techniques to implement the functionality described for the mobile app.

Referring back to FIG. 1, the operation of client device 101 is described in more detail. Preferably, client device 101 includes two or more cameras 214. For example, in one embodiment, a first "IN" camera 214a is directed at the inside of a vehicle, i.e., the cabin, driver, and passengers, and a second "OUT" camera 214b is directed at the road in front of the vehicle. In alternative embodiments, additional cameras 214 may be used, for example facing the back and/or sides of the vehicle, multiple interior areas of the vehicle, one or more top camera with a wide-angle lens providing a 360° view around the vehicle, or the like.

According to one embodiment, client device 101 is always turned on as long as it has sufficient power to operate. Cameras 214a and 214b are always turned on and recording video. The video recorded by the cameras 214 is buffered in the memory device 203. In one embodiment, memory device 203 is configured as a circular buffer. For example, in one embodiment, memory device 203 may be a 32 Gb FLASH memory device. Client device 101 manages the buffer in memory device 203 to store video data for a predetermined and programmable set amount of time. For example, in one embodiment, memory device 203 buffers video data from two cameras 214a and 214b for the preceding 24 hours.

In one embodiment, client device 101 includes software to manage the cameras 214 to control the amount of data, e.g., bytes, generated by the cameras 214 and buffered in memory 203. In one embodiment, cameras 214 record data at various selectable video modes and rates. For example, cameras 214a and 214b can be set by client device 101 to capture video at various resolutions, including for example 1440p, 1080p, 720p, 360p, 240p, and the like. In addition, the frame rate for the video collected by each camera 214 can be set by client device 201. For example, in one embodiment, each camera 214 can independently change its video capture rate from 0 to 30 frames per second.

Figure 5:
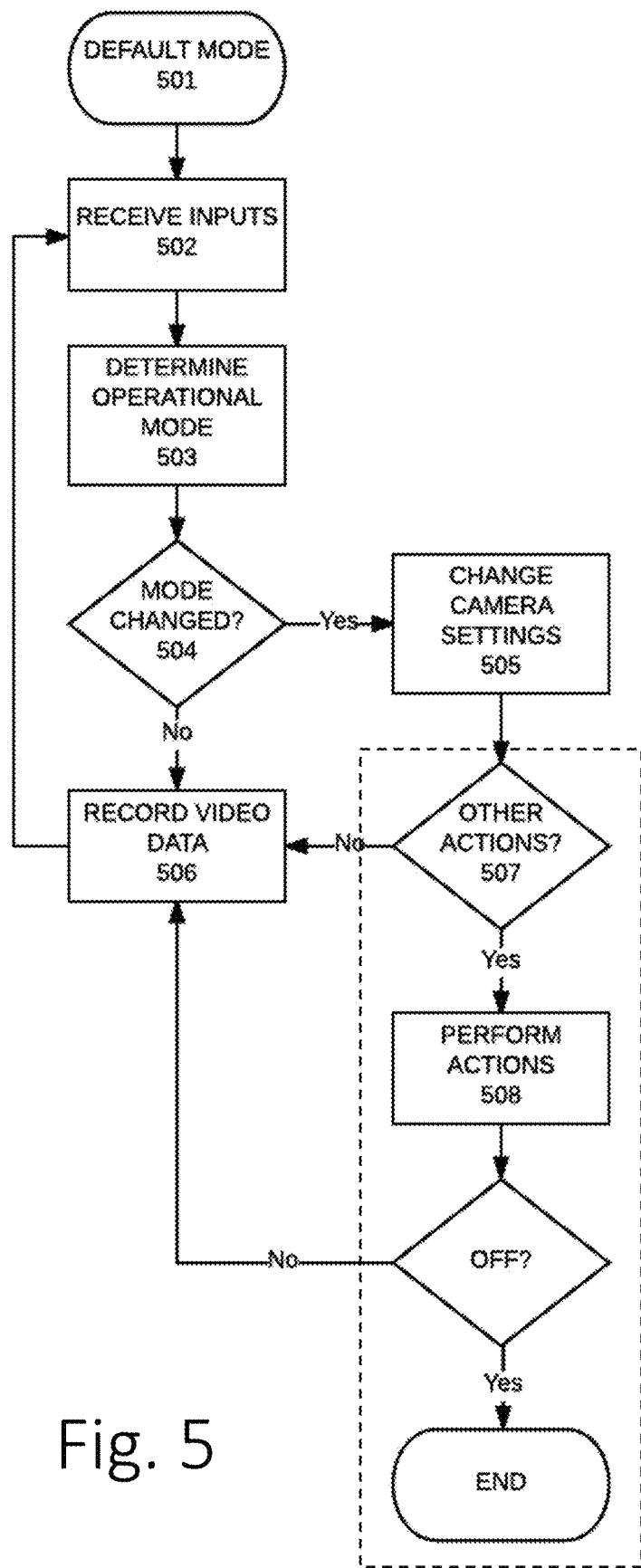
FIG. 5 is a flow chart illustrating a method of video data collection according to one embodiment.

Now referring to FIG. 5, a method for collecting video for managing video buffering according to one embodiment is described. In one embodiment, various inputs are used to change the resolution and frame rate for each available camera. Upon powering up, cameras are set to default recording settings 501. Multiple inputs are received 502 from various sources. For example, in one embodiment, processor 201 receives location and/or motion data from a location module 204, acceleration data from an accelerometer sensor 215a, vehicle status data, such as for example the revolutions per minute ("RPM") of a vehicle's engine, vehicle battery charge level, and the like, from I/O module 201 connected to a CAN bus, time from wireless module 205 (e.g., LTE network time), image processing inputs from video module 207 (e.g., face recognition, human body recognition, etc.), and the like. The inputs are used to determine the relevant features affecting the operation mode of the vehicle, such as for example, motion or lack of motion, presence of a user, presence of a person but not the user, or the like.

Based on the inputs received, an operational mode is determined 503. For example, the possible operational modes of a vehicle incorporating client device 101 according to one embodiment may include: default, driving, recently parked, parked, armed, low battery, and very low battery. Different embodiments can provide a subset or additional modes of operation, which may also vary depending on the vehicle or other location where the client device 101 (or auxiliary camera) may be located. A status change is determined at step 504. For example, after powering up, input data is received and the operational mode is no longer in "Default" mode. Based on the determined operational mode, the camera settings (e.g., resolution and frame rate) are changed 505 to produce more or less data for the video being recorded. Once the camera settings have been changed, recording of the video is done 506 using the camera settings. This results in video data objects, records, or files of varying size to manage the buffer, storing higher quality data with more bits during operational modes with higher likelihood of capturing video for events of interest while using lower quality data with less bits during operational modes with lower likelihood of capturing video of interest.

In an alternative embodiment, as illustrated in FIG. 5, additional actions may be associated with the various operational modes. In this embodiment, the method checks 507 if the operational mode requires additional actions. If so, the actions are performed at step 508. As one of ordinary skill in the art will understand, different actions may be associated with different modes to provide additional functionality to the system within the scope of the invention. If one of the actions does not turn off the system, then recording can continue at step 506 as described above. Now referring to FIG. 6a, a method for capturing and storing video according to one embodiment is provided. As noted above, video cameras in the various devices are preferably always on and recording video. Once video is being recorded, the method beings 601 and continues until the device is turned off or, in the case of a mobile device 104, until the mobile app stops running. For each camera, the image sensor generates video data according to the camera settings for the current operational mode as described above with reference to FIG. 5. The video data is received 602 and the video for each preset time period is encoded 603 according to a video compression and encoding standard, such as for example, MPEG-4, H.264, H.265, or any other video compression and encoding standard. The time period for each block of video may be predetermined or variable (e.g., based on user settings) and may be, for example, 2, 4, 6, or 10 seconds. In one embodiment, every two seconds of video is encoded together into a video data object, record, or file. Other embodiments may use different time periods depending, for example, on the intended use of the video, the purpose for the system, the location where the system is deployed, the amount of memory available, the processing power available, or other relevant factors. Metadata for the same time period is also captured 604 as information associated with the captured video data. As part of the metadata capture 604, a globally unique ID ("GUID") is generated to uniquely identify the video data and metadata for the time period.

In one embodiment, the video data is encrypted 605. Any encryption algorithm may be used, such as, for example encryption algorithms compliant with the Advanced Encryption Standard (AES), Blowfish, Twofish, Data Encryption Standard (DES) (e.g., Triple-DES), RSA, or the like.

Figure 6A:
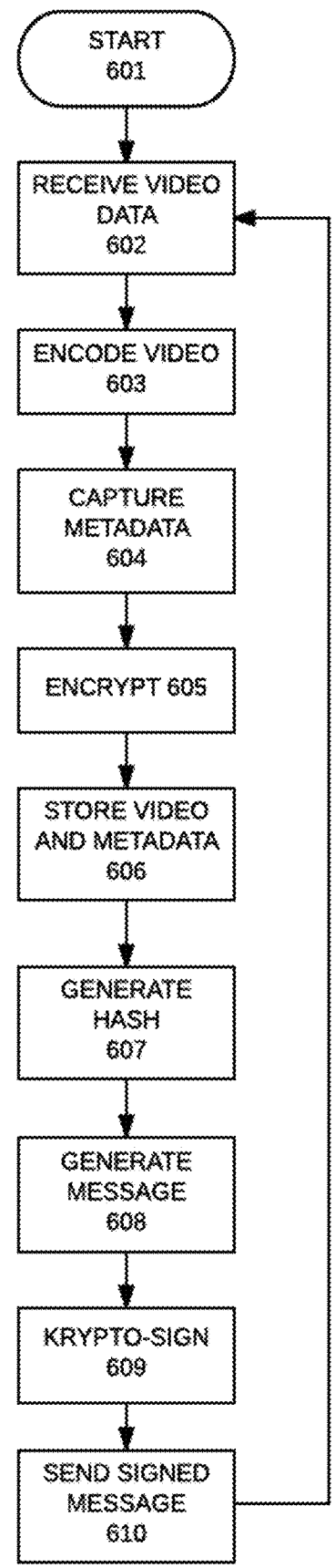
FIG. 6a a flow chart illustrating a method for cloud-based data collection and analysis of event-based data according to one embodiment.

Referring back to the method of FIG. 6a, the encrypted video data and associated metadata for the given time period are stored 606 in the buffer. The resulting video data object or file will be of varying size based on the camera settings (e.g., resolution, frame rate, etc.) applied as well as any other factors, such as applied compression format and encoding. The video data object is then hashed 607 using a one-way hash function, such as SHA, MD5, or similar algorithm, to generate a unique hash for the captured video, i.e., the video data hash. Optionally, the hashing function may be applied to a file that includes both the video data and metadata. Alternatively, the metadata may be stored separately but in association with the video data and it is not included in the generation of the hash 607.

In one embodiment, a message is generated 608 including the metadata for each time period and the corresponding video data hash. Preferably, the message is then cryptographically signed 609 to guarantee the message payload originates from an authorized device. For example, a private key associated with a system-authorized device may be used to generate a one-way hash of the message payload. In an alternative embodiment, the private key is used to encrypt the payload of the message. In one embodiment, each client device 101, auxiliary camera 106, and mobile device 104, is associated with a unique cryptographic key-pair. The device securely stores the private key. The cloud system 103 retains access to the public keys for each device so it can verify that messages it receives come from authorized devices. For example, cloud system 103 maintains a set of records uniquely associating a device ID for each authorized device in the system with a corresponding public key that is applied to messages received from the device. For example, private-public-key cryptographic signature methodologies may be used to verify that each received message includes a signature or encrypted payload encrypted with a private key from an authorized device.

In yet another embodiment, at step 607, optionally, instead of hashing the video data object, the client device uses its private cryptographic key to cryptographically sign or otherwise encrypt the video data object itself, for example, if the actual video data object is to be sent or otherwise uploaded to another device, such as cloud system 103. This could optionally be done in conjunction with step 609 as described above.

Finally, the message is sent 610 to the cloud system. Preferably, the message is sent using a secured connection, such as for example, an SSL/HTTPS connection over TCP/IP or the like. The process then repeats for the video data and metadata captured in the subsequent time period. Preferably, the time required to perform the process of FIG. 6a is less than the selected time period. For example, a device capturing video data in two-second increments (the time period) sends the metadata and video hash message to the cloud system 103 every two seconds. If at some point the data connection to the cloud is interrupted or otherwise becomes unavailable, the system may locally cache the messages for transmission upon reconnection to the cloud system 103.

In an alternative embodiment, the message signing step 609 is omitted. Instead, a device establishes a secured connection with the cloud system 103, such as an SSL/HTTPS connection, and authenticates itself to the server 102. For example, a device provides its device ID and a cryptographically signed version of its device ID, signed with the device's private key. The server 102 retrieves the public key corresponding to the device ID provided and verifies the signed device ID for a match. Upon authorization, the server provides the device with a session token that uniquely identifies communications from that device for a given session. Thereafter messages are sent 610 over the secured connection with the metadata and video hash and also including the server-provided token.

Now referring to FIG. 6b, a data model for capturing metadata associated with a given video data object or file is provided according to one embodiment. In one embodiment, the video-object metadata 620 is periodically sent to cloud system 103 as device telemetry information. In one embodiment, the telemetry information 620 is sent after the recording of each video object, e.g., every 2 seconds, 6 seconds, 8 seconds, 10 seconds, or the like. The video-object metadata 620 may include one or more metadata items including, for example, a device ID 621, an atomic clock time stamp 622, a GPS timestamp 623, a latitude value 624, a longitude value 625, an altitude 626, a speed 627, a compass heading 628, a horizontal accuracy value 629, a vertical accuracy value 630, a software version 631, a location string value (e.g., a "geohash") 632, a connection type identifier (e.g., 2G, 3G, 4G, WiFi, etc.) 633, a wireless signal strength value 634, and/or a carrier identifier 635. One of ordinary skill in the art would understand that any combination of these metadata values may be used depending on the implementation and intended use of the metadata.

Now referring to FIG. 6*c*, a data model for capturing metadata associated with a given event-based video clip, such as an automatically generated video clip, a user-generated video clip, or the like, is provided according to one embodiment. In one embodiment, the event metadata 650 is generated and stored with each video clip. The event metadata 650 may include one or more metadata items including, for example, device ID 651, an atomic clock time stamp 652, a location string value (e.g., geohash) 653, an event or tag type 654, an event or tag type 655, an event or tag title 656, an event or tag latitude value 657, an event or tag longitude value 658, an event or tag altitude 659, an event or tag speed 660, an event or tag compass heading 661, an event or tag horizontal accuracy value 662, an event or tag vertical accuracy value 663, the full file name for the an event or tag clip file (e.g., manifest file) 664, a software version 665, a device type ID 664, and one or more Boolean variables to indicate whether the event or tag clip has been viewed 665*a*, shared 665*b*, deleted 665*c*, etc.

Figure 7:
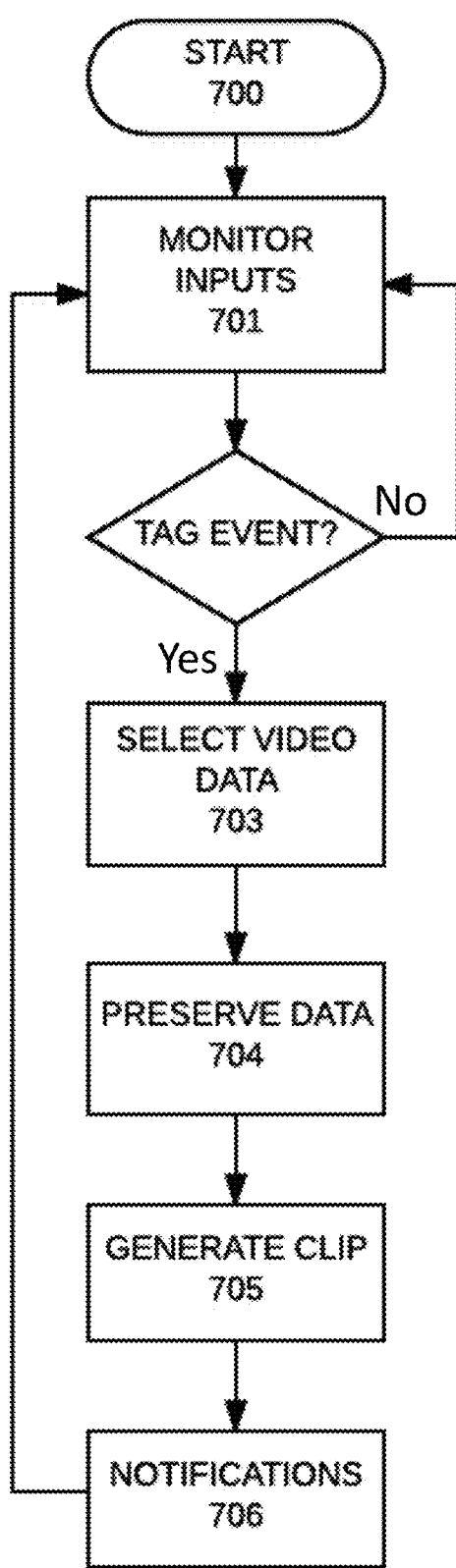
FIG. 7 is a flow chart illustrating a method for generating event-based video clips according to one embodiment.

Now referring to FIG. 7, a method for generating event-based video clips according to one embodiment is described. Upon activation of the system, the method starts 700. The various inputs are monitored 701 while video is continuously captured. If no tagging event is detected 702, the system keeps monitoring. If a tagging event is detected 702, the relevant video data in the buffer is identified and selected 703. For example, once an event is detected 702, the video files for a predefined period of time before and after the event is identified in the buffer. In one example, 15 seconds before and after the event time is used. The amount of time, preferably between 10 and 30 seconds, may be pre-programmed or user selectable. Further, two different time periods may be used, one for time before the event and the other for time after the event. In one embodiment, the time periods may be different depending on the event detected. For example, for some events the time periods may be 30 seconds before event and 1 or 2 minutes after while other events may be 15 seconds before and 15 seconds after.

The selected video data is marked for buffering 704 for a longer period of time. For example, the video files for the selected time period are copied over to a second system buffer with a different buffering policy that retains the video for a longer period of time. In one embodiment, the selected video data being in a buffer storing video for 24 hours is moved over to a second buffer storing video for 72 hours.

Referring back to FIG. 7, a video clip is then generated 705 with the selected video data. Like every video data object, every video clip generated is associated with a globally unique identifier (GUID). In one embodiment, video clips are generated using a playlist file or manifest file as is known in the art. Each playlist or manifest file includes a GUID. For example, in one embodiment, an m3u8 playlist file is generated according to the HTTP Live Streaming specification (as for example described in Internet Draft draft-pantos-http-live-streaming-23 submitted by Apple, Inc. to IETF on May 22, 2017). Alternative video clip generating techniques may be used in other embodiments, including, for example, MPEG-DASH (ISO/IEC 23009-1), Adobe's HTTP Dynamic Streaming, Microsoft's Smooth Streaming, or the like. The playlist or manifest file provides network-based location for the video data objects selected 703. For example, a Universal Resource Locator (URLs) may be provided for each of a set of video files. Using this approach, the video data can be stored in any network accessible storage. For example, video files identified in a given playlist can be stored on a camera device (e.g., client device 101, auxiliary camera 106, or mobile device 104) and network address locators are provided for each file at that location. In alternative embodiments, other video clip generation approaches may be used. For example, in one embodiment, the selected 703 video data is used to generate a single video file, such as an MPEG video file, that may be uploaded and downloaded as needed.

In one embodiment, video data objects are stored on the network-accessible buffer of the camera device and the playlist or manifest files for the generated event-based video clips identify the network addresses for the memory buffer memory locations storing the video data objects or files. Alternatively, upon identifying and selecting 703 the relevant video data objects, in addition to or as an alternative to moving the video data to the longer buffer 704, the video data may be uploaded to the cloud system 103, or alternatively transferred to a paired mobile device 104 upon establishment of a direct data connection, such as a WiFi or cellular connection. The clip generation 705 then identifies in the playlist or manifest file the network addresses for the video data stored in the cloud system 103. A combination of these approaches may be used depending on storage capacity and network capabilities for the camera devices used in the system or according to other design choices of the various possible implementations. In one embodiment, other system components, such as the cloud system 103 or mobile device 104, are notified 706 of the event or event-based video clip. For example, in one embodiment a message including the GUID for the generated video clip is sent to the cloud system in a cryptographically signed message (as discussed above). Optionally, the playlist or manifest file may also be sent in the message. In one embodiment, the playlist or manifest files are maintained in the local memory of the camera device until requested. For example, upon notification 706 of the clip generation, the cloud system may request the clip playlist or manifest file. Optionally, the cloud system may notify 706 other system components and/or other users of the clip and other system components or users may request the clip either from the cloud system 103 or directly from the camera device. For example, the clips pane 401*a* in the user's mobile app may display the clip information upon receiving the notification 706. Given that the clip metadata is not a large amount of data, e.g., a few kilobytes, the user app can be notified almost instantaneously after the tag event is generated. The larger amount of data associated with the video data for the clip can be transferred later, for example, via the cloud system or directly to the mobile device 104, for example, via a cellular or WiFi connection. For example, upon detection of a "Baby/Animal in Parked Car" event or a "Location Discontinuity" event, the user's mobile device 104 may be immediately notified of the tag event using only tag metadata. Subsequently, the user can use the video clip playlist to access the video data stored remotely, for example, for verification purposes. In one embodiment, video clips are automatically transferred to the user's authorized and authenticated mobile device 104 automatically upon detection of the mobile device 104 in proximity of the client device 101, for example after establishing a WiFi connection. A lower cost data communication approach is preferable for transferring video data avoiding expensive cellular data charges.

Once a video clip is generated 705, it may be shared with other devices owned by the same user or, if authorized, the video clip may be shared with other users of the system. For example, the GUIDs for every video clip generated by a camera device of a given user may be stored in a user clip table in the cloud system 103. For example, GUIDs for the clips from all the cameras on a multi-camera client device 101, for the clips from any auxiliary camera device 106, and for the clips generated by the mobile app on the user's mobile device 104, may all be stored in the user clip table. The user may access the user clip table via mobile device 104. For example, mobile app may maintain a user clip table that is synchronized with the user clip table in the cloud system. Every time a new clip notification is received, the mobile app and cloud-based user clip tables are updated and or synchronized. Alternative synchronization approaches may be used, such as for example a periodic synchronization approach.

In addition to the GUID, in one embodiment, the user clip tables may also include other information or metadata for each clip of the user, such as for example, a name or descriptor, device ID where the video was captured, time and date information, tag or event information, thumbprint images, or the like. Further, the playlist or manifest file may also be stored or identified in the user clip table. In one embodiment, a user may access video clips through the mobile app on the mobile device 104 through the clip pane 401a. Upon selection of a clip through the clip pane 401a, the mobile app uses the clip GUID to request the corresponding playlist or manifest file from the cloud system 103, directly from a camera device (e.g., client device 101 or auxiliary camera 106), of if previously transferred, from its local storage. Using the playlist or manifest file, the mobile app can playback the video clip by requesting the relevant video objects using their network address identifiers, which may point to a remote storage (e.g., cloud 103 or client device 101/106) or local storage on the mobile device 104. In one embodiment, if the video data objects are encrypted, the user may provide an identification (e.g., biometric ID, face recognition, user ID and password, or the like) to access the decryption key.

Now referring to FIG. 11, a flow chart for a method to access the buffer of a client device 101/016 from a mobile device 104 according to one embodiment. As described above with reference to FIG. 4b, the user may access the video data stored in the buffer of a client device 101/106 from the mobile device app, for example, from the cameras pane 401b. In one embodiment, the mobile device 104 and client device 101/106 are paired and able to communicate with each other. For example, the pairing process described below, with reference to FIG. 10, may be used to securely pair the client device 101/106 with a mobile device 104 running one embodiment of the mobile device app. Through the pairing process, the client device 101 is able to recognize when the mobile device 104 is nearby 1300, such as when it is within range of its short-range communication radio. For example, the client device 101 may receive the Bluetooth ID from the mobile device 104, which may be recognized as a "bonded" device based on its Bluetooth ID or may otherwise be notified of its proximity via cloud system 103 upon detection of its BLE beacon as described below. According to one embodiment, as a measure of security, client devices will only communicate with recognized trusted devices that have gone through a pairing process.

Once the client device 101/106 has detected a known or trusted mobile device 104 in proximity, it enters into a WiFi hotspot mode 1301. The mobile device 104 then gets the network parameters 1302 to connect to the WiFi hotspot. In one embodiment, the mobile device 104 requests the network parameters from the client device 101/106 wirelessly, for example, through the Bluetooth connection or cellular messaging via cloud system 103. Alternatively, the client device 101/106 may provide the network parameters to the mobile device 104 wirelessly, for example via Bluetooth, via cellular messaging through cloud system 103, or the like, once it detects the proximity of the mobile device 104, for example using Bluetooth, based on its BLE beacon and proximity messages from the mobile device 104, or the like. In another embodiment, the network parameters may be provided to a mobile device 104 paired with client device 101/106 (either the primary paired device, a subset of paired devices, or all paired devices) during the initial mobile device association process, as for example described with reference to FIG. 8. In one embodiment, the network parameters include the hotspot name ("SSID"), an access password or token (e.g., based on WEP or WPA/2/Enterprise security modes), and other information. Preferably, the communication of the network parameters to the mobile device is end-to-end encrypted, for example, using a shared key or asymmetric encryption as further described below. For added security, the client device's hotspot SSID does not need to be advertised or broadcasted since the network parameters, including the SSID, are directly provided to the mobile device 104.

The mobile device 104 uses the network parameters to join the client device's WiFi hotspot 1303. In one embodiment, the mobile device programmatically switches to the WiFi network with the provided SSID and password. For example, on an Apple iOS device, this switch would prompt the user to select "join" to authorize the network connection, but no additional user input would be required as the password information can be programmatically provided. On an Android OS device, the programmatic switch can be accomplished without any user input. Once connected, the mobile device app can request access to the video data 1304 stored in the client device's buffer using any of the techniques described above. In one embodiment, the client device generates playlists or manifest files 1305 for each of the contiguous video objects stored in the buffer, e.g., 2-second, 4-second, 6-second, etc. video objects. The playlists or manifest files are provided to the mobile device 104 over the established WiFi connection 1306, identifying the network addresses of the video object files stored in the client device's buffer. While in the embodiment described above, the connection between the mobile device 104 and client device 101/106 is a WiFi connection, in other embodiments the same functionality is available through other wireless connections, including cellular, Bluetooth™, and the like. The mobile app (or other video player app) allows the user to playback and scrub back and forth 1307 through the set of video object files stored in the buffer. For example, the "cameras" pane 401b in mobile app may include a "live" window 410 and an additional display area for buffered video (e.g., last 24 hours, a pre-set number of days, or the like).

In one embodiment, for example, HTTP Live Stream ("HLS") playlists are used for the method of FIG. 11. Each playlist is a combination of the 2-6 second clips, back-to-back, without significant interruption, for example, without stopping the playback between files or otherwise interrupting the playback in a way that is noticeable to the user. To include multiple different files back-to-back in the same playlist, in one embodiment, the #tag, typically used to insert advertisements in a playlist, may be placed in front of the name/location of each video object file in the buffer, essentially designating every video object to be an advertisement. While HLS playlists typically provide different streams from a single file, using the #tag approach allows the streaming of the same video feed from separate but continuous files (of a few seconds each). This approach allows for continues smooth playback of high-quality video, without significant interruption, and provides high performance seeking through the entire buffer of video objects stored in the client device 101/106. Further, since the video objects are already stored in few-second increments (e.g., 2, 4, 6, etc.) the video objects in the client device buffer require no additional processing, avoiding any additional delay. In addition, in one embodiment, the HLS playlists are nested to allow for access to longer time periods worth of video. In this embodiment, the client device 101/106 generates hierarchical playlists of playlists, to avoid overly long playlists. For example, in one embodiment, a master playlist may list a plurality of other playlists, each in turn listing a plurality of video objects with corresponding network locations. When scrubbing from the mobile app through time (or location as described in FIG. 4e), based on the master playlist, the mobile app switches which HLS playlist is in use at any given time. Each playlist may include, for example, a few minutes to a few hours of video from the video object files in the buffer. In one embodiment, each playlist includes video objects or files for 10-20 minutes of video. This enables the user to see long periods of time worth of video, possibly multiple days, and scrub instantly across the entire time. The same approach may be used for access event-generated clips or other video accessed using playlists described herein.

Figures 8, 9:
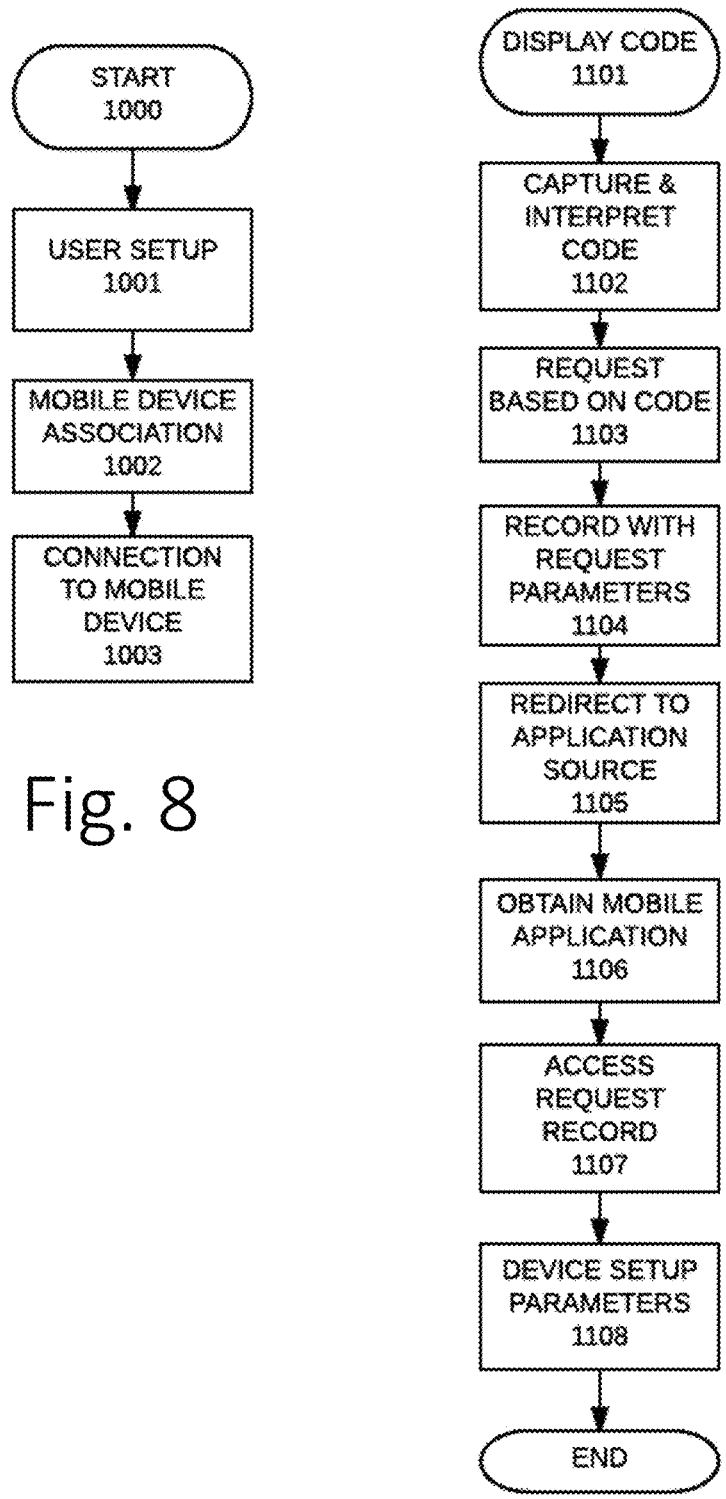
FIG. 8 is a flow chart illustrating a method for setting up a client device according to one embodiment.
FIG. 9 is a flow chart illustrating a method for obtaining a mobile app from a mobile device according to one embodiment.

According to another aspect of the disclosure, a process for setting up a camera device, such as a client device 101, is provided. Referring to FIG. 8, a method for setting up a camera device for operation in the system according to one embodiment is described. In one embodiment, camera devices, such as client device 101, include cellular connectivity that is operational as soon as the device is powered up. Cellular connectivity provides a data connection 107/108 between the camera device and the cloud system 103 that can be used during the set-up process. When the camera device 101/106 is powered up, the set-up process begins 1000. While the following set up steps are provided in order, no particular order is required for these steps. For example, in one embodiment, a user set up step 1001 is performed. In one embodiment, the user set up step 1001 allows the camera device to recognize the user. For example, in one embodiment, a client device 101 provides instructions to a user to pose in different orientations while facing one of the cameras to record different angles of the user's face. Optionally, a similar process may be used to recognize other user biometrics, including for example, fingerprints, voice, and irises. For example, a touch sensor may be used to record a series of images of a user's fingerprint. Voice recognition software may be trained by having the user repeat pre-defined commands, statements, or sentences one or more times. In one embodiment, a user's iris is recorded from multiple angles to derive a biometric optical signature. Other embodiments may include a combination of these biometrics identifications and may further include others.

The user's biometric signature or signatures are stored in the camera device. In one embodiment, a cryptographic key is also generated based on a random input and stored in association with the biometric identification of the user. Optionally, if more than one user is required, for example for a vehicle with multiple possible drivers, the user set up process 1001 is repeated for each user.

Referring back to FIG. 8, another set up step involves the association of the camera device with one or more mobile devices 104. It should be noted that mobile device 104 may itself be a camera device, and thus some of the set-up steps, such as user set up step 1001 may be applicable. In one embodiment, mobile device 104 includes a mobile app installed on the device as described above with reference to FIG. 4a-4e. In one embodiment, mobile device 104 and camera device (e.g., client device 101) include short range wireless modules, such as Bluetooth transceivers. As is known in the art, short range wireless modules may transmit a unique ID that can be received by other short range wireless modules as a for of identification of devices in forming a piconet or otherwise pairing with each other. For example, Bluetooth transceivers can provide a unique 12-digit hexadecimal address ("BD_ADDR") for identification and pairing. In one embodiment, a user may prompt the camera device to pair with the user's mobile device 104. For example, in one embodiment, the user may utter a voice pairing command, provide a pairing command through a touchscreen, or through any other user input device available in the camera device. In one embodiment, the pairing process involves a Bluetooth paring process. In another embodiment, the camera device displays a unique pattern that is captured by the mobile device and sent back to the camera device via the connection to the could system 103. For example, camera device may display a randomly generated alphanumeric code, a QR code, a series of black and white screens in a random order, or some other random output. The random output is captured or entered into the mobile device by the mobile app and transmitted via a secured Internet connection to cloud system 103 along with a unique identifier of the mobile device, such as, for example a Bluetooth address, a MAC address, or the like. The random output and the mobile device input are compared. If they match, the camera device authenticates the mobile device unique identifier (e.g., Bluetooth address or MAC address) and from that point on is associated with the mobile device. In an alternative embodiment, instead of comparing the output of the client device with the input captured by the mobile device, both devices generate an output that is compared at the server. For example, each device uses a camera to perform face recognition of the user during the set-up process and their face recognition results are sent to the server for comparison to match the same user.

In one embodiment, a QR code is displayed on the display of the client device 101. The QR code encodes a device ID for the client device 101 and an encryption key (or seed for generation of an encryption key) for communicating with the client device 101. The mobile app on the mobile device 104 captures and interprets the QR code to obtain the device ID and encryption key. The device ID may for example include a telephone number, email address, or other means for electronic messaging with the client device 101. Using the encryption key, the mobile device 104 can send encrypted communications to the client device 101 as further described below to associate the mobile device with the client device, including for example, sending to the client device 101 a unique identifier for the mobile device 104, for example, telephone number, email address, Bluetooth address, MAC address, or the like. While described with the client device 101 being the device that displays the QR code, the same approach may be used with the mobile device 104 displaying the QR code and the client device 101 initiating the encrypted messaging using the encryption key provided by the mobile device 104.

Other "shared secret" approaches may be used for mobile device association 1002, include for example, a series of instructions to cause the user to move the mobile device while the mobile app records the outputs of one or more mobile device sensors to be matched with the provided instructions. For example, the user may raise or lower the device, shake the device, etc. in a random series causing accelerometer and/or gyroscope changes that match the requested motions. The series of sensor-detected motions can be provided via Internet connection for matching with the camera device instructions for association. Alternatively, in one embodiment, a user may provide a telephone number for the mobile device during a registration process, for example through the mobile device app. For the mobile device association step 1002, camera device may display a device ID on its screen. The user inputs the device ID on the mobile app and it is transmitted to the cloud system 103. The cloud system identifies the device ID and sends a message to the camera device 101/106 via Internet connection 107/108 including the telephone number for mobile device 104. The camera device sends a text message to mobile device 104 with a random code. The user inputs the random code via the mobile app for verification by cloud system 103 or camera device 101/106. If the random code matches the texted code, the mobile device is authenticated. Once the camera device and the mobile device are associated 1002, the camera device can trust the mobile device for subsequent interactions, based on a unique ID for the mobile device (e.g., Bluetooth address, MAC address, or the like). According to another aspect of disclosure, in one embodiment, the set-up process optionally includes the step of provisioning the mobile device 104 with a mobile app. FIG. 9 provides an exemplary flow diagram for an initial set-up process according to one embodiment. As described above, camera device 101/106 includes a wireless cellular connection to the Internet and is configured to communicate with cloud system 103 out of the box. When the camera device is first turned on, the screen displays a QR code 1101. A mobile device can use one of its existing apps to capture the QR code with its camera and interpret the code 1102. In this embodiment, the QR code provides a link or URL to a web-server, for example in cloud system 103. The link or URL may include an IP address or a domain (e.g., www.owlcam.com) and a set of parameters encoded therein as is known in the art. One of the parameters may include, for example, a unique ID for the camera device 101/106 being set up, such as for example, a mobile device number, a telephone number, a serial number, or the like. Optionally, the link parameters may also include a randomly generated number that is different for different times the set-up process is run. Alternatively, instead of displaying a QR code, the same process may be performed providing the link and parameters in alternative forms, including for example, by displaying them on the screen as text/image, encoding them in an audio signal, transmitting them via short range communication (IR, AirDrop, Bluetooth, etc.) or the like.

Upon interpreting the QR code, the mobile device uses its existing software (e.g., a web browser) to send 1103 an HTTP request to the web server identified through the link or URL and including the parameters encoded into the link. The cloud system 103 receives the request and creates 1104 a record for the request, including the link-encoded parameters and additional metadata and network information derived from the HTTP requesting process, including information for uniquely identifying the mobile device 104 (e.g., combination of HTTP heather metadata, TCP/IP header information, or the like). In addition, cloud system 103 redirects 1105 the mobile device to a location from where the appropriate mobile app may be obtained. For example, cloud system 103, using, for example, the "User-Agent" data from the HTTP request and/or the unique device ID for the camera device 101/106, redirects the mobile device 104 to either the Apple App Store when the User-Agent indicates the mobile device to be an iOS device or to the Google Play Store if the mobile device is determined to be an Android-based device or alternatively, to other servers capable of providing the mobile app to the mobile device over a network. Similarly, the cloud system 103 may include parameters in the redirection link to the appropriate version of the mobile app determined using the device ID of the camera device 101/106.

Once redirected, the mobile device 104 obtains 1106 the proper mobile app, e.g., the app for interaction with camera device 101/106 and cloud system 103. After the downloading and installation of the mobile app on mobile device, when executed, the mobile app contacts the cloud system 103 to access 1107 the record previously generated at step 1104. For example, the mobile app may derive a unique ID for the mobile device 104 using the same parameters, metadata, or other information available from the mobile device 104 when making an HTTP request like the one made at step 1103. In one embodiment, a time limit (e.g., 2-15 minutes) may be used between the HTTP request step 1103 and the record access step 1107 to facilitate the mobile device 104 identification. Cloud system 103 determines that the same mobile device 104 is accessing the system based on that information and provides 1108 access to the previously generated record and any other additional set up parameters that may be necessary to complete the set-up process. For example, if provided, the randomly generated number may be provided as a "shared secret" for the device association process described above. Alternatively, encryption information and/or messaging information for the camera device may be provided. Referring back to FIG. 8, another aspect of the disclosure involves setting up a direct connection between a camera device 101/106 and a mobile device 104. In one embodiment, camera device 101/106 includes wireless local area network connectivity. In this embodiment, for example, a client device 101 may optionally operate as an access point (AP) for a local area network, such as Wi-Fi network. The mobile device 104 can establish a connection 109 to the client device 101 as a Wi-Fi station (STA). While a specific wireless local area network connection is described, it is understood that the present invention can be applied to a wide variety of wireless connection modes, such as, for example, Peer-to-Peer connections (e.g., "Wi-Fi Direct," ad hoc network, or the like). The camera device can use the MAC address authenticated through a mobile device association process 1002 to determine whether the associated mobile device is the one making the connection. The direct camera device to mobile device connection 109 may then be used to transfer settings, video data objects, video clips, biometric signatures, and the like, in a secured way between the devices. For example, in one embodiment, once the direct camera device to mobile device connection 109 is established, a data synchronization process can automatically transfer video clips and other data, such as settings, user preferences, etc. from the camera device to the mobile device and vice versa.

Figure 10:
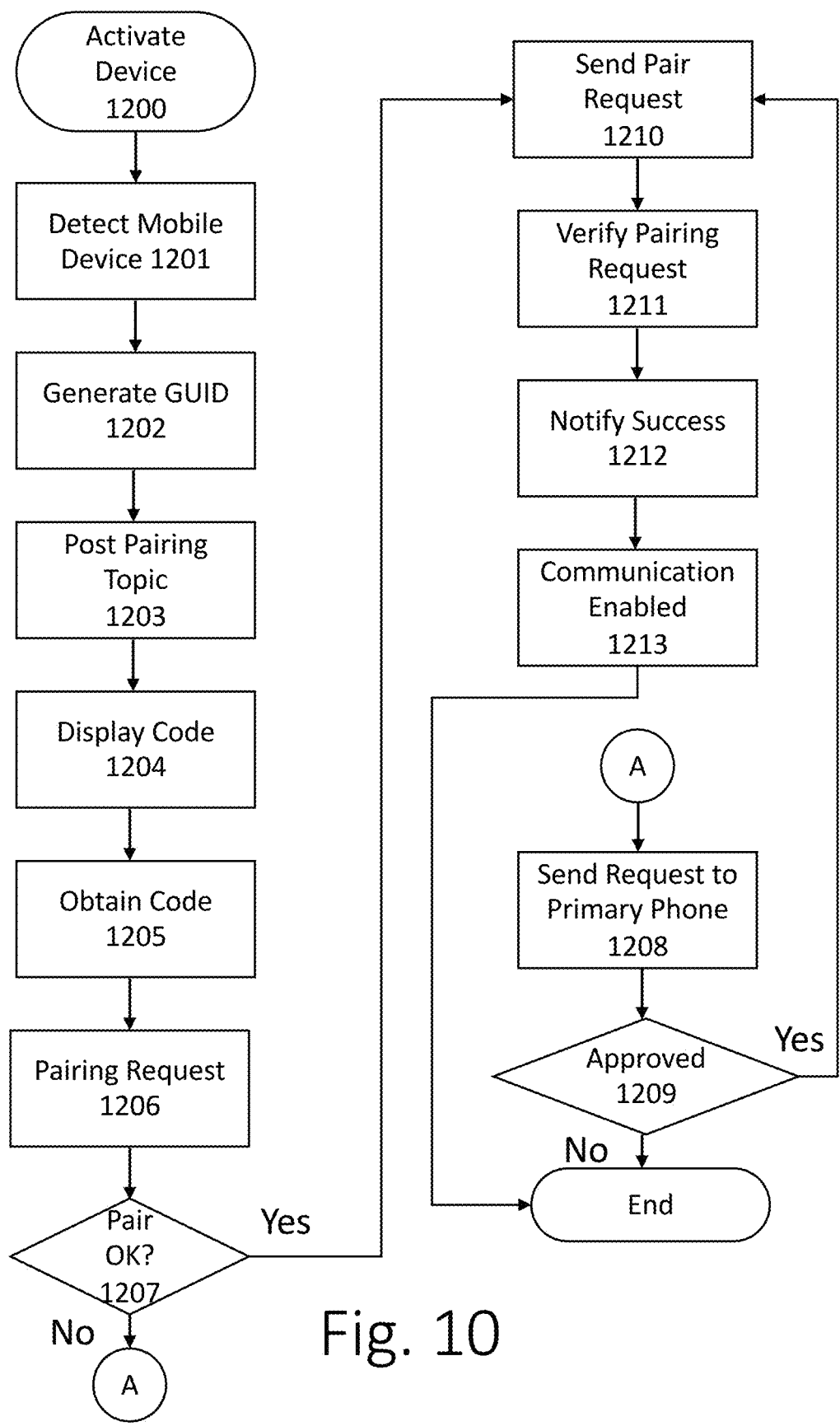
FIG. 10 is a flow chart illustrating a method for setting up and pairing a client device and a mobile device according to another embodiment.

FIG. 10 provides an exemplary flow diagram for an alternative initial set-up process according to one embodiment. According to this embodiment, the mobile app is in the device 104, obtained as shown in FIG. 9, downloaded directly from a mobile application repository (e.g., App Store or Google Play Store), downloaded from another website or Internet-accessible location, or otherwise. Once installed in the mobile device 104, the mobile app is used to securely pair to a client device 101/106 as shown in FIG. 10. When a client device 101/106 is activated 1200 for the first time, it is not paired to any mobile device 104. To pair a mobile device 104 according to this embodiment, the mobile device 104 broadcasts an identifying signal, such as its Bluetooth ID, WiFi identifier, or the like. The client device 101/106 detects the presence 1201 of mobile device 104, for example, the client device 101/106 scans Bluetooth signals and records the Bluetooth IDs of all the devices transmitting within range of the client device 101/106. Other means of wirelessly detecting mobile devices in proximity may be used. The client device 101/106 generates a GUID 1202 and establishes communication with the cloud system 103, for example, using its integrated cellular connection. A GUID may for example be generated from a mobile device number (e.g., International Mobile Subscriber Identity ("IMSI"), Integrated Circuit Card ID ("ICCID"), International Mobile Equipment Identity ("IMEI"), or similar), a telephone number, a serial number, or the like. The client device 101/106, using its GUID creates a communication record or "topic" 1203 on the cloud system 103 that can be used to post messages intended for pairing with the client device 101/106. The "topic" may be uniquely identified by the GUID of the client device 101/106 or by an additional or alternative topic identifier or "subject." According to one embodiment, other system elements can post messages, including any form of data, by identifying the proper topic with the associated GUID of the recipient device. In one embodiment, "topics" are implemented as secured electronic mail messaging accounts (e.g., to:GUID@cloudsystemoptics.com). Alternatively, topics may be treated as "conversations" or "threads" of related messages (e.g., with the same "subject") for a given GUID-identified device (e.g., to:GUID@cloudsystemtopics.com; subject:topicID). In another embodiment, the Message Queuing Telemetry Transport ("MQTT") protocol is used with the cloud system 103 providing a message broker function. However, any other suitable messaging approach may be used within the scope of the invention, such as the Advanced Message Queuing Protocol ("AMQP"), Streaming Text Oriented Messaging Protocol ("STOMP"), the IETF Constrained Application Protocol ("CoAP"), the Extensible Messaging and Presence Protocol ("XMPP"), OPC-UA from the OPC Foundation, or Web Application Messaging Protocol ("WAMP"), to name some examples. Their respective specifications are hereby incorporated by reference.

Similar to step 1101 in FIG. 9, after creating the "topic" 1203, the client device 101/106 may display on its screen a code 1204. The mobile device 104 can use the app associated with the cloud system 103 to obtain the code 1205, for example, capturing a QR code with its camera, and interpret the code using the cloud-system-specific app software. In this embodiment, the QR code provides information for the mobile device 104 to message the client device 101/106 via the cloud system 103, for example, the client device's GUID and may also include an identifier for the pairing "topic" generated at step 1203. This information is encoded into the QR code as is known in the art. Optionally, the code may also include a randomly generated number that is different for different times the set-up process is run. As further described below, according to another embodiment, the code may also include encryption information to allow encrypted messaging between mobile device 104 and the client device 101/106, such as for example, a public key of the client device for the mobile device to encrypt at least part of the messages it will send to the client device. Alternatively, instead of displaying a QR code, the same process may be performed providing a hyperlink and parameters in alternative forms, including for example, by displaying them on the screen as text/image, encoding them in an audio signal, transmitting them via short range communication (IR, Air-Drop, Bluetooth, etc.) or the like. With the information provided by the code, the mobile device 104 sends a pairing request 1206 via cloud system 103 to the client device 101/106, for example, identified the GUID and/or pairing topic created at step 1203. The pairing request also includes other pairing information for the client device 101/106 to communicate with the mobile device 104. For example, according to one embodiment, the pairing request includes one or more of a GUID of the mobile device (e.g., IMSI, IMEI, or similar), the Bluetooth ID for the mobile device, and encryption information, such as for example, a public key for the mobile device 104. Optionally, in one embodiment, before conveying the pairing request message to the client device 101/106, the cloud system 103 checks 1207 whether to allow a new mobile device 104 to pair with the client device 101/106 identified in the pairing request. For example, in one embodiment, the cloud system maintains a paring record for each client device 101/106 (e.g., based on the devices' GUIDs) storing pairing information for each device, such as for example the GUID for each mobile device 104 paired with each client device 101/106. If the system determines that this client device GUID has an existing paired mobile device 104, an authorization request is sent to the existing or "primary" mobile device 104. Multiple mobile devices 104 may be allowed to pair with the same client device 101/106 if approved by the first or user-designated "primary" mobile device 104 that is already paired with the client device 101/106. The pairing record for the client device is used by the cloud system to keep track of the paired devices.

Upon approval by the primary mobile device 1209, the paring request is conveyed 1210 to the client device 101/106. The client device receiving the pairing request verifies 1211 the pairing request. For example, in one embodiment, the client device 101/106 checks that it is in "pairing mode" and/or that it can otherwise pair with a mobile device 104. In addition, the client device 101/106 checks the pairing information, including whether the Bluetooth ID for the mobile device 104 is found in the list of Bluetooth IDs scanned at step 1201 indicating that the mobile device 104 is located near the client device, within range of short-range wireless communications. The client device 101/106 stores the pairing information and once the pairing request is verified 1211, it notifies the cloud system 103 that pairing has succeed 1212. According to one embodiment, the cloud system 103 updates its pairing record for the client device 101/106 to include the newly paired mobile device 104 and notifies the mobile device 104 of the pairing success.

At this point, communication between the client device 101/106 and the mobile device 104 are enabled 1213 and the paring process ends. The mobile device 104 and client device 101/106 can now, for example, post messages to each other on their respective "topics" via cloud system 103 using a messaging protocol, such as MQTT, for example. All messaging between the two devices enabling the functionality described above can be exchanged via the cloud-based messaging approach establish according to this embodiment. For example, the mobile device 104 can request a secured real-time feed of the video in the buffer memory of client device 101/106 using this approach and send and receive commands, for example, using RTC technologies as is known in the art. While all communications with the cloud system 103 may be encrypted, e.g., with the encryption provided by the cellular channels 107/108, using SSL, or similar communication channel encryption, the messaging between the two end-point devices can further be end-to-end encrypted. For example, the two devices can use the cloud messaging to do a Diffie-Hellman key exchange and use each other's key to encrypt the payloads of the messages sent via the cloud messaging system. Alternatively, as described above, the QR code may include a public key for the client device 101/106 that the mobile device can use to encrypt its own public key and include it in the pairing information with the paring request. Having each other's public keys, the two devices can then encrypt the payload of all the messages they exchange from that point on. In an alternative embodiment, the QR code can include a "shared secret" as described above with reference to FIG. 8 which can be used as a symmetric encryption key or to generate a symmetric encryption key that then is used by both devices to communicate securely.

According to one embodiment, when multiple mobile devices 104 are paired with a client device 101/106, the client device 101/106 may detect the proximity of the mobile devices using an alternative approach. According to this embodiment, the client device 101/106 implements a Bluetooth beacon protocol (e.g., iBeacon, AltBeacon, URI-Beacon, Eddystone, or the like) using Bluetooth Low Energy ("BLE") to determine proximity of mobile devices 104. Any mobile device 104 with a cloud system enabled app, as for example described above with reference to FIG. 4a-4e, upon detecting the client device's beacon, wirelessly sends a message to the client device announcing its presence, and for example providing its mobile device GUID. Mobile devices 104 that have undergone a pairing process as described above, will recognize the beacon for the paired client device 101/106. The message may be sent via Bluetooth, WiFi, cellular, or using other wireless communications. For example, when multiple mobile devices 104 need to be detected in proximity to the client device 101/106, each paired mobile device 104 detecting the beacon sends a presence message to client device 101/106 via cloud system 103, either using a cellular or WiFi transmission. The cloud system 103 delivers the message to client device 101/106 such that the client device can determine which mobile devices 104 are in close proximity. According to one embodiment, client device 101/106 continues to periodically broadcast its beacon (the period may vary depending on conditions, such as for example battery status, presence of recognized mobile devices, operational mode, or the like). When a mobile device 104 stops receiving the beacon at the expected reception time it determines that it no longer is in proximity of the client device 101/106 and sends another proximity message to client device 101/106 via cloud system 103 to inform the client device 101/106 that it no longer is in its proximity. Proximity messages may be time stamped so that the client device can determine periods when mobile devices are in proximity or not, for example, should the proximity messages be delayed (e.g., no cellular coverage).

As those in the art will understand, a number of variations may be made in the disclosed embodiments, all without departing from the scope of the invention, which is defined solely by the appended claims. It should be noted that although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general-purpose computer or a processor.

Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. One or more processors in association with software in a computer-based system may be used to implement methods of video data collection, cloud-based data collection and analysis of event-based data, generating event-based video clips, sharing event-based video, verifying authenticity of event-based video data files, and setting up client devices according to various embodiments, as well as data models for capturing metadata associated with a given video data object or file or for capturing metadata associated with a given event-based video clip according to various embodiments, all of which improves the operation of the processor and its interactions with other components of a computer-based system. The camera devices according to various embodiments may be used in conjunction with modules, implemented in hardware and/or software, such as a cameras, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module, or the like.

What is claimed is:

1. A method for associating a video capturing device with a first mobile device, the method comprising:
   obtaining a unique pattern with a sensor in the first mobile device, the unique pattern being obtained from the video capturing device, the first mobile device being within a proximity of the video capturing device sufficient to allow the sensor to obtain the unique pattern;
   sending a request to pair the first mobile device with the video capturing device based in part on the unique pattern to the video capturing device, the request including a first unique identifier for the first mobile device; and
   receiving a pairing notification from the video capturing device upon successful association of the video capturing device with the first mobile device,
   wherein the sending further comprises sending the request to a cloud system associated with the video capturing device, the cloud system configured to transfer the request to the video capturing device via wireless communications, and
   wherein the unique pattern encodes a topic associated with the video capturing device and further wherein the request is addressed to the topic.

2. The method of claim 1, wherein the unique pattern includes at least one of a QR code, a random code, a set of successive black and white screens in a random order, a bar code, a sound, a set of instructions to cause a motion-based pattern of the first mobile device, a face recognition signal, a fingerprint signal, or a voice recognition signal.

3. The method of claim 1, wherein the unique pattern is a QR code displayed on a display of the video capturing device.

4. The method of claim 3, wherein the QR code encodes a second unique identifier and further comprising decoding the unique pattern to determine the second unique identifier.

5. The method of claim 4, wherein the second unique identifier is the first unique identifier for the first mobile device.

6. The method of claim 4, wherein the second unique identifier is one of a phone number or an email address associated with the video capturing device.

7. The method of claim 4, further wherein the QR code encodes an encryption key data object and further comprising decoding the unique pattern to determine an encryption key.

8. The method of claim 7, further comprising encrypting the request before sending it using the encryption key.

9. The method of claim 8, wherein the sending is done via a text message to a phone number encoded in the QR code.

10. The method of claim 1, wherein the unique pattern encodes a second unique identifier, the second unique identifier associated with a proximity signal corresponding to the first mobile device detected by the video capturing device.

11. The method of claim 10, wherein the successful association is based at least in part in a match between the first unique identifier in the request and the second unique identifier associated to the proximity signal of the first mobile device.

12. The method of claim 1, wherein:
the cloud system is configured to transfer the request to the video capturing device upon determining that the association with the first mobile device is appropriate.

13. The method of claim 12, wherein the determining comprises determining if a second mobile device was previously associated with the video capturing device.

14. The method of claim 13, wherein the determining comprises receiving authorization from the second mobile device for the association with the first mobile device.

15. A method for associating a video capturing device with a first mobile device, the method comprising:
obtaining a unique pattern with a sensor in the first mobile device, the unique pattern being obtained from the video capturing device, the first mobile device being within a proximity of the video capturing device sufficient to allow the sensor to obtain the unique pattern;
sending a request to pair the first mobile device with the video capturing device based in part on the unique pattern to the video capturing device, the request including a first unique identifier for the first mobile device; and
receiving a pairing notification from the video capturing device upon successful association of the video capturing device with the first mobile device,
wherein the unique pattern is a QR code displayed on a display of the video capturing device,
wherein the QR code encodes a second unique identifier and further comprising decoding the unique pattern to determine the second unique identifier,
further wherein the QR code encodes an encryption key data object and further comprising decoding the unique pattern to determine an encryption key,
further comprising encrypting the request before sending it using the encryption key, and
wherein the sending is done via a text message to a phone number encoded in the QR code.

16. A method for associating a video capturing device with a first mobile device, the method comprising:
obtaining a unique pattern with a sensor in the first mobile device, the unique pattern being obtained from the video capturing device, the first mobile device being within a proximity of the video capturing device sufficient to allow the sensor to obtain the unique pattern;
sending a request to pair the first mobile device with the video capturing device based in part on the unique pattern to the video capturing device, the request including a first unique identifier for the first mobile device; and
receiving a pairing notification from the video capturing device upon successful association of the video capturing device with the first mobile device,
wherein the sending further comprises sending the request to a cloud system associated with the video capturing device, the cloud system configured to transfer the request to the video capturing device via wireless communications,
wherein the cloud system is configured to transfer the request to the video capturing device upon determining that the association with the first mobile device is appropriate, and
wherein the determining comprises determining if a second mobile device was previously associated with the video capturing device.

17. The method of claim 16, wherein the determining comprises receiving authorization from the second mobile device for the association with the first mobile device.

* * * * *